United States Patent
Mirica et al.

(10) Patent No.: US 12,398,165 B2
(45) Date of Patent: *Aug. 26, 2025

(54) TWO-DIMENSIONAL STIMULI-RESPONSIVE COVALENT ORGANIC FRAMEWORKS WITH HIGH INTRINSIC CONDUCTIVITY

(71) Applicant: Trustees of Dartmouth College, Hanover, NH (US)

(72) Inventors: Katherine A. Mirica, Hanover, NH (US); Zheng Meng, West Lebanon, NH (US); Robert M. Stolz, Lyme, NH (US)

(73) Assignee: Trustees of Dartmouth College, Hanover, NH (US)

( * ) Notice: Subject to any disclaimer, the term of this patent is extended or adjusted under 35 U.S.C. 154(b) by 232 days.

This patent is subject to a terminal disclaimer.

(21) Appl. No.: 18/126,871

(22) Filed: Mar. 27, 2023

(65) Prior Publication Data
US 2023/0348513 A1    Nov. 2, 2023

Related U.S. Application Data

(63) Continuation of application No. 16/855,819, filed on Apr. 22, 2020, now Pat. No. 11,634,446.

(60) Provisional application No. 62/837,118, filed on Apr. 22, 2019.

(51) Int. Cl.
*G01N 15/04* (2006.01)
*C07F 15/04* (2006.01)
*G01N 27/12* (2006.01)

(52) U.S. Cl.
CPC ......... *C07F 15/045* (2013.01); *G01N 27/126* (2013.01)

(58) Field of Classification Search
CPC .... C07F 15/045; C07F 15/025; C07F 15/065; C07F 1/005; G01N 27/126; G01N 27/127
See application file for complete search history.

(56) References Cited

U.S. PATENT DOCUMENTS

| | | | |
|---|---|---|---|
| 11,634,446 B2 * | 4/2023 | Mirica | C07F 15/065 |
| | | | 502/159 |
| 2012/0152845 A1 * | 6/2012 | LeVan | B01J 20/3265 |
| | | | 210/660 |
| 2014/0011286 A1 * | 1/2014 | Potyrailo | G01N 33/0031 |
| | | | 427/466 |
| 2015/0231622 A1 * | 8/2015 | Kitagawa | B01J 37/0209 |
| | | | 502/152 |
| 2016/0229873 A1 * | 8/2016 | Talin | B01J 31/16 |
| 2017/0073364 A1 * | 3/2017 | Dinca | H01G 11/30 |

* cited by examiner

*Primary Examiner* — Alvaro E Fortich
(74) *Attorney, Agent, or Firm* — Shackelford, McKinley & Norton, LLP

(57) ABSTRACT

In an embodiment, the present disclosure pertains to a method of sensing an analyte in a sample by: (1) exposing the sample to an electrode that includes a covalent-organic framework with a plurality of metal-coordinated aromatic units that are linked to one another by aromatic linkers; (2) detecting a change in a property of the electrode; and (3) correlating the change in the property to the presence or absence of the analyte. In an additional embodiment, the present disclosure pertains to said covalent-organic frameworks. Additional embodiments of the present disclosure pertain to methods of making the covalent-organic frameworks.

27 Claims, 22 Drawing Sheets

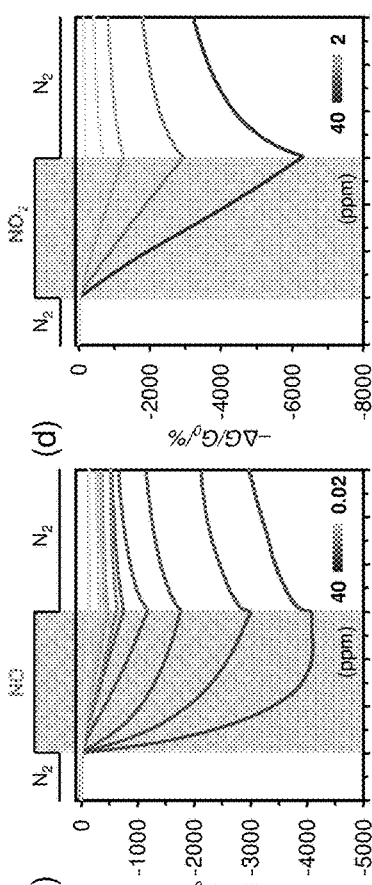
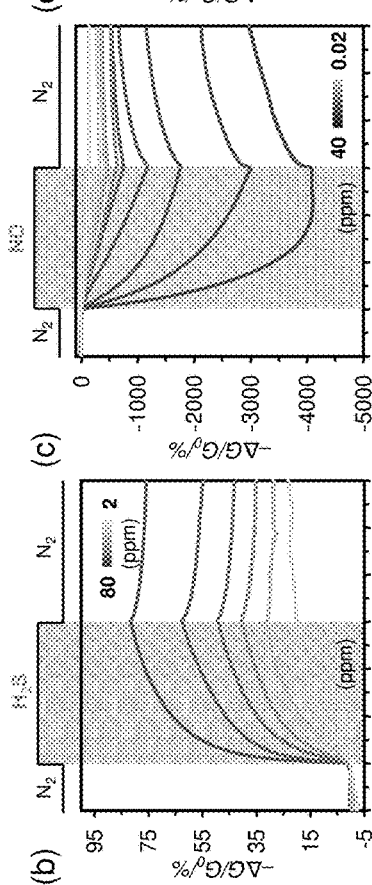
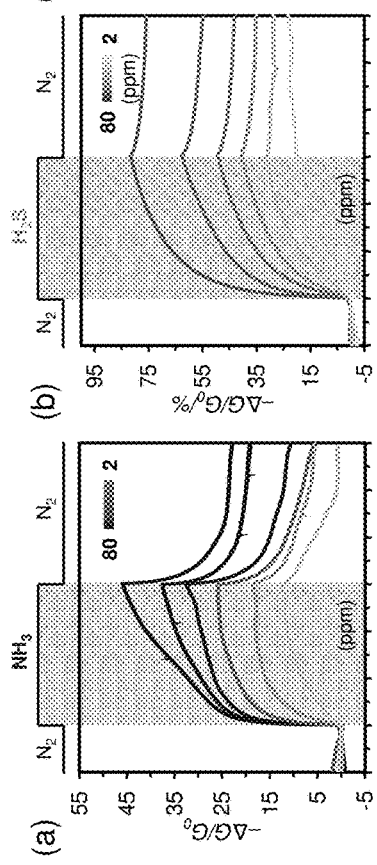
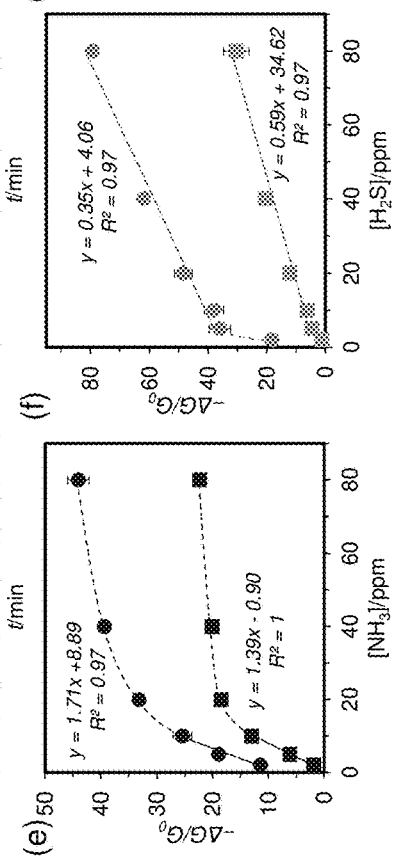
FIG. 5A  FIG. 5B  FIG. 5C  FIG. 5D
FIG. 5E  FIG. 5F  FIG. 5G  FIG. 5H

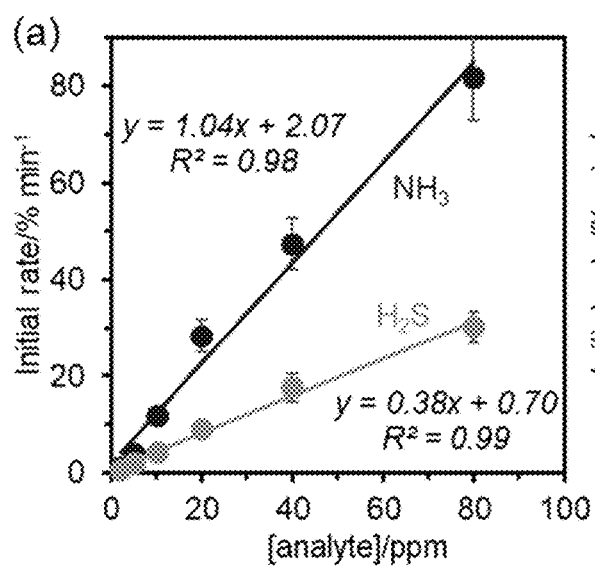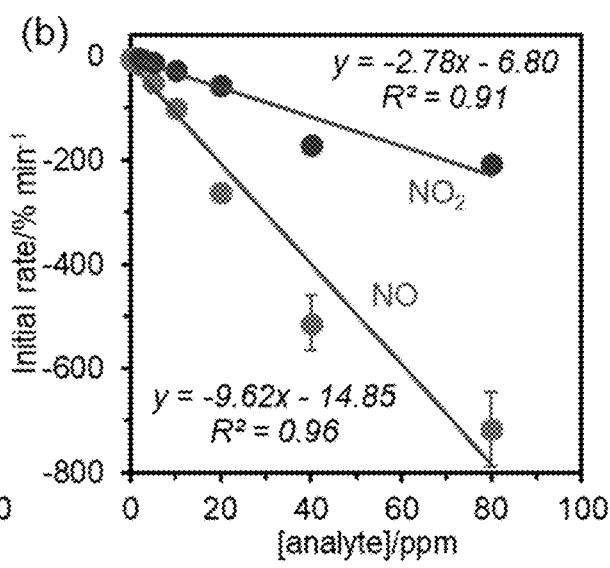
FIG. 6A  FIG. 6B

TWO-DIMENSIONAL STIMULI-RESPONSIVE COVALENT ORGANIC FRAMEWORKS WITH HIGH INTRINSIC CONDUCTIVITY

STATEMENT REGARDING FEDERALLY SPONSORED RESEARCH

This invention was made with government support under W911NF-17-1-0398 awarded by the Department of Defense. The government has certain rights in the invention.

CROSS-REFERENCE TO RELATED APPLICATIONS

This application is a continuation of U.S. patent application Ser. No. 16/855,819, filed on Apr. 22, 2022, which claims priority to U.S. Provisional Patent Application No. 62/837,118, filed on Apr. 22, 2019. The entirety of each of the aforementioned applications is incorporated herein by reference.

BACKGROUND

Current chemiresistive sensors face several challenges, including limited conductivity, limited sensitivity, and limited stability. Various embodiments of the present disclosure addresses the aforementioned challenges.

SUMMARY

In an embodiment, the present disclosure pertains to a method of sensing an analyte in a sample. In some embodiments, the method includes exposing the sample to an electrode that includes a covalent-organic framework. In some embodiments, the covalent-organic framework includes a plurality of metal-coordinated aromatic units that are linked to one another by aromatic linkers. In some embodiments, the method further includes detecting a change in a property of the electrode and correlating the change in the property to the presence or absence of the analyte.

In another embodiment, the present disclosure pertains to covalent-organic frameworks that include a plurality of metal-coordinated aromatic units that are linked to one another by aromatic linkers. In some embodiments, the covalent-organic framework is in the form of a fully aromatic and conjugated structure.

Additional embodiments of the present disclosure pertain to methods of making the covalent-organic frameworks of the present disclosure. In some embodiments, the methods of the present disclosure include conjugation of metal-coordinated aromatic units through the utilization of aromatic linkers. In some embodiments, the conjugation occurs through aromatic annulation.

DESCRIPTION OF THE DRAWINGS

FIG. 3A shows top and side view of the structure of COF-DC-8 with 2×2 square grids in eclipsed stacking mode with a Lieb lattice. FIG. 3B shows a comparison of the simulated and experimental powder X-ray diffraction (PXRD) patterns of COF-DC-8. FIG. 3C shows a scanning electron microscopy (SEM) of COF-DC-8. FIG. 3D shows a transmission electron microscopy (TEM) of COF-DC-8.

FIGS. 5A, 5B, 5C, 5D, 5E, 5F, 5G, and 5H Illustrate chemiresistive responses of devices with integrated COF-DC-8 to (FIG. 5A) $NH_3$ (ammonia) (FIG. 5B) $H_2S$ (hydrogen sulfide), (FIG. 5C) NO (nitric oxide), and (FIG. 5D) $NO_2$ (nitrogen dioxide) under an applied voltage of 1.0 V and an atmosphere of dry nitrogen. Also shown are responses ($-\Delta G/G_0$) of COF-DC-8 after 1.5 min (squares) and 30 min (circles) exposure versus concentration of (FIG. 5E) $NH_3$, (FIG. 5F) $H_2S$, (FIG. 5G) NO, and (FIG. 5H) $NO_2$.

FIGS. 6A and 6B illustrate the initial rate of response as a function of concentration of (FIG. 6A) reducing gases $NH_3$ and $H_2S$ and (FIG. 6B) oxidizing gases of NO and $NO_2$.

FIG. 7C shows X-ray photoelectron spectroscopy (XPS) of S 2p range of COF-DC-8 after $H_2S$ exposure. FIG. 7D shows XPS of N 1s range of COF-DC-8 after $NO_2$ exposure.

FIGS. 20A and 2B illustrate (FIG. 20A) calculated electronic band structure (left side) and density of state (right side) for CoPc-Pyr-COF and (FIG. 20B) the corresponding first Brillouin zone and high-symmetry K-points.

DETAILED DESCRIPTION

Figure 1A:
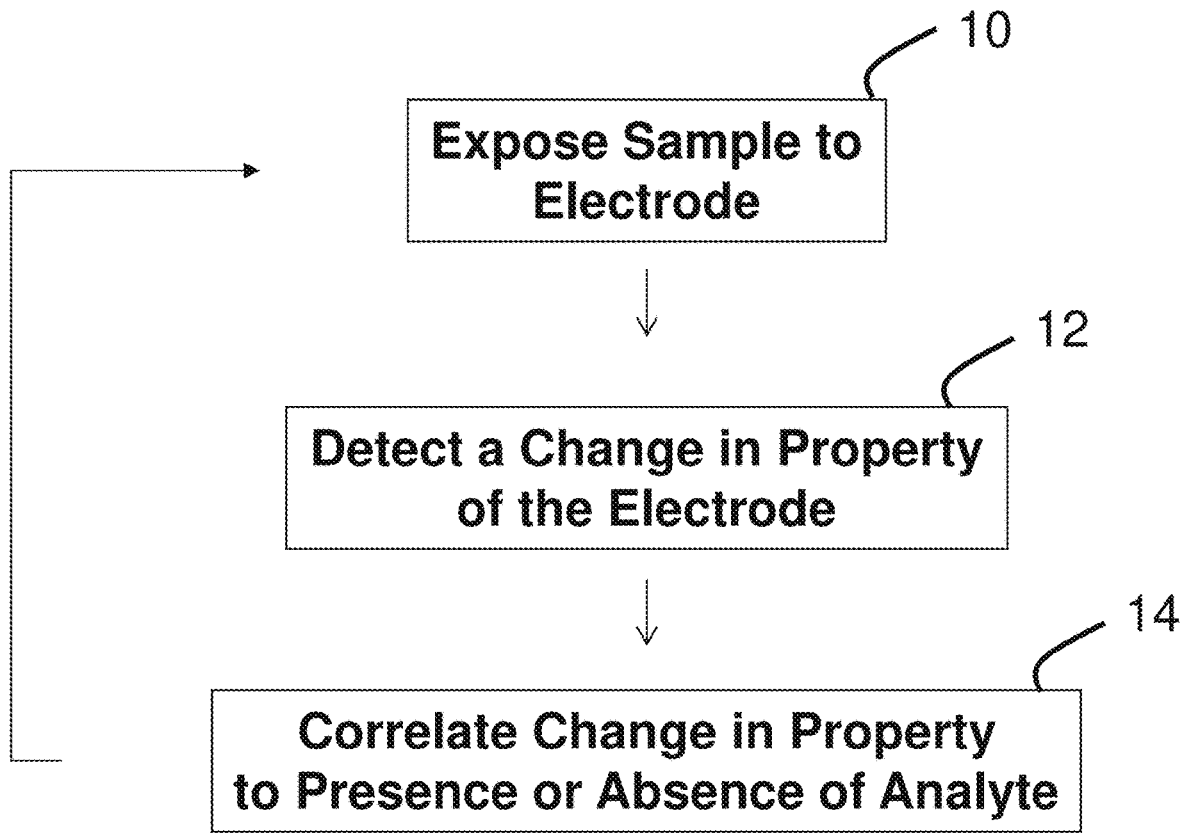
FIG. 1A illustrates a method of sensing an analyte in a sample according to an aspect of the present disclosure.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

The development of chemically robust, porous, and electrically conductive nanomaterials drives progress in electronic devices, energy storage, catalysis, and chemical sensing. Recent advances in the synthesis of electrically conductive metal-organic frameworks (MOFs) have enabled a range of applications in electrocatalysis, energy storage, and chemical sensing that were previously believed to be inaccessible using traditionally insulating MOFs.

Both through-bond and through-space charge transport mechanisms have proven to be effective in promoting conductivity in MOFs. In particular, the molecular design strategy focusing on planar two-dimensional MOFs, in which the formation of π-d conjugated sheets can promote the delocalization of charge, has yielded metallic conductivities. Despite the progress in the development of conductive MOFs, the design and synthesis of electrically conductive covalent-organic frameworks (COFs)—which arguably possess superior chemical stability—has remained a tremendous challenge. Although doping of COFs with oxidants and guest molecules has led to conductivities of ~$10^{-2}$ to $10^{-1}$ siemens per meter (S/m), the access to intrinsically conductive COFs with high conductivity remains limited.

Building on the general principles of molecular engineering for other classes of conductive materials (e.g., conductive organic polymers, conductive organic molecular solids, and conductive coordination polymers), the strategy of molecular design of intrinsic conductive COFs can leverage two established approaches: maximizing through-bond and through-space charge transport. To achieve through-bond charge transport, the covalent linkages formed during COF synthesis should be able to promote the charge delocalization efficiently.

Previous theoretical and experimental studies on one-dimensional (1D) and two-dimensional (2D) conjugated polymers with single bonds in their backbones rarely showed high charge carrier mobility values, suggesting that the borate and imine linkages in typical COFs may be inefficient at facilitating through-bond charge transport. Full annulation of building blocks through aromatic linkages has been established as a promising strategy for conjugated 2D COF formation, but has not yet yielded materials with high intrinsic conductivity.

To achieve through-space transport, the strategic choice of building blocks is required to maximize orbital interactions within the resulting framework structure. Although several reports have taken advantage of π-stacking for designing COF-based materials with reasonable charge carrier mobilities (8.1 $cm^2$ $V^{-1}$ $s^{-1}$), their bulk conductivities remained limited.

Accordingly, a need exists for the development and use of covalent-organic frameworks with improved conductivity, sensitivity, and stability. Various embodiments of the present disclosure address the aforementioned need.

In some embodiments, the present disclosure pertains to methods of sensing an analyte in a sample. In some embodiments illustrated in FIG. 1A, the methods of the present disclosure include one or more of the following steps: exposing a sample to an electrode that includes a covalent-organic framework with a plurality of metal-coordinated aromatic units linked to one another by aromatic linkers (step 10); detecting a change in a property of the electrode (step 12); and correlating the change in the property of the electrode to the presence or absence of the analyte (step 14). In some embodiments, the methods of the present disclosure can be repeated multiple times.

Figure 1B:
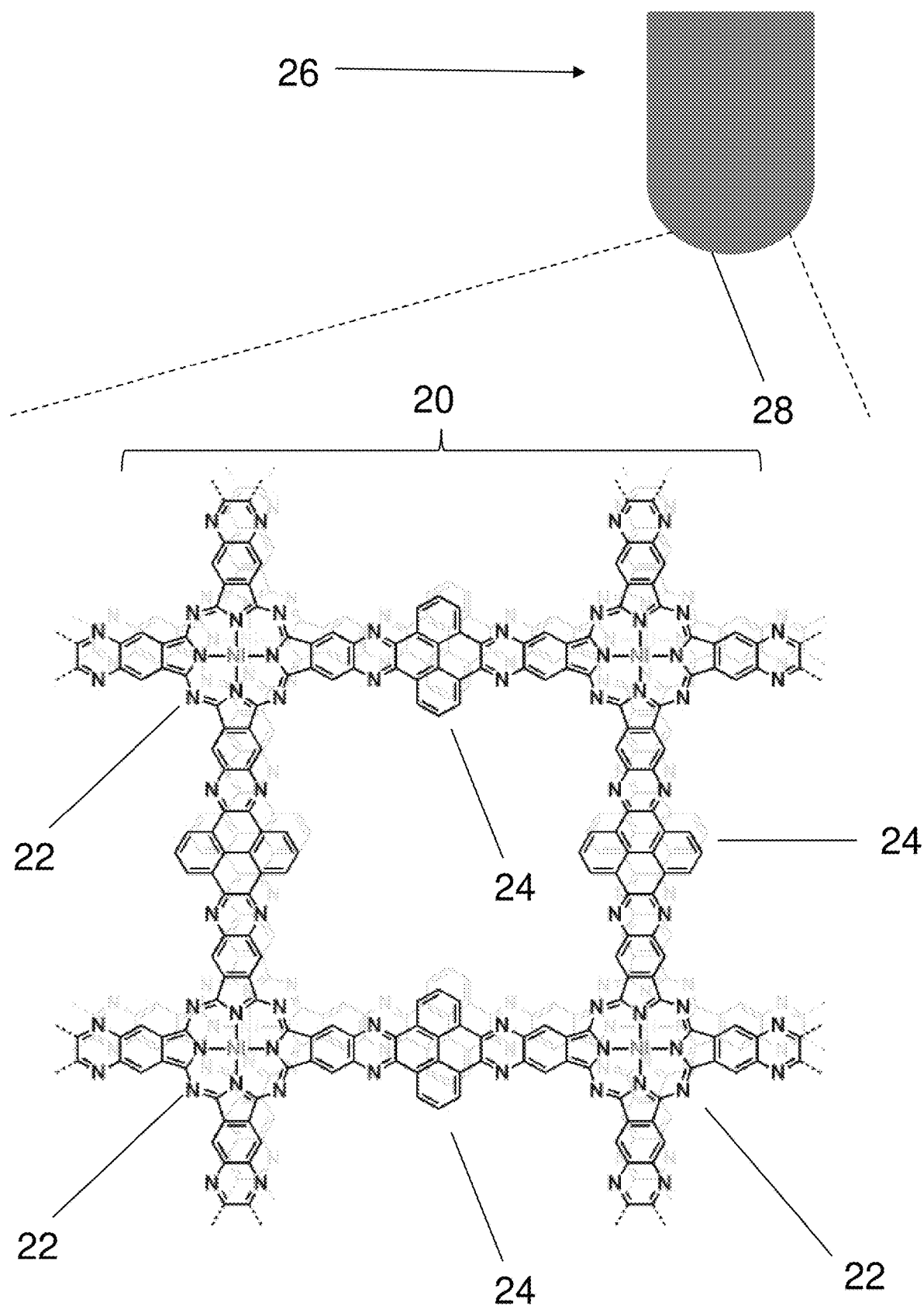
FIG. 1B depicts a covalent-organic framework (COF) according to an aspect of the present disclosure.

Additional embodiments of the present disclosure pertain to covalent-organic frameworks that include various configurations. In some embodiments illustrated in FIG. 1B, the covalent-organic frameworks of the present disclosure are illustrated as covalent-organic framework 20, which includes a plurality of metal-coordinated aromatic units 22 linked to one another by aromatic linkers 24.

In some embodiments, the covalent-organic frameworks of the present disclosure may be associated with electrodes. For instance, in some embodiments that are further illustrated in FIG. 1B, covalent-organic framework 20 is associated with surface 28 of electrode 26. In some embodiments, electrode 26 is a component of a device, such as a chemiresistive device.

Further embodiments of the present disclosure pertain to methods of making the covalent-organic frameworks of the present disclosure. In some embodiments, such methods involve the conjugation of metal-coordinated aromatic units through the utilization of aromatic linkers.

As set forth in more detail herein, the methods and covalent-organic frameworks of the present disclosure can have numerous embodiments. In particular, various covalent-organic frameworks may be utilized in various manners to sense the presence or absence of various analytes in various samples. Various methods may also be utilized to make the covalent-organic frameworks of the present disclosure.

Methods of Sensing Analytes

The analyte sensing methods of the present disclosure generally include one or more of the following steps: (1) exposing a sample to an electrode that includes a covalent-organic framework with a plurality of metal-coordinated aromatic units that are linked to one another by aromatic linkers; (2) detecting a change in a property of the electrode; and (3) correlating the change in the property to the presence or absence of the analyte.

As set forth in more detail herein, the methods of the present disclosure can utilize various covalent-organic frameworks having various metal-coordinated aromatic units, metals, aromatic linkers, structures, and properties. Additionally, the methods of the present disclosure can be utilized to sense various analytes from various samples.

Metal-Coordinated Aromatic Units, Metals, and Aromatic Linkers

The covalent-organic frameworks of the present disclosure can include various metal-coordinated aromatic units, metals, and aromatic linkers. For instance, in some embodiments, the metal-coordinated aromatic units include, without limitation, metallophthalocyanine units. In some embodiments, the metallophthalocyanine units can include, without limitation, octatosylaminophthalocyanine.

The metal-coordinated aromatic units can include one or more metals. In some embodiments, the one or more metals include, without limitation, first row transition metals, divalent metals, transition metals, iron, nickel, copper, cobalt, zinc, manganese, platinum, palladium, gold, bismuth, chromium, magnesium, tin, and combinations thereof. In some embodiments, the one or more metals include, without limitation, cobalt, iron, nickel, copper, and combinations thereof.

The metals of the covalent organic frameworks of the present disclosure may be in various forms. For instance, in some embodiments, the metals may be in the form of metal ions, metal clusters, metallic nodes, metal catecholates, metal salts, and combinations thereof.

In some embodiments, only one type of metal may be used within the same covalent-organic frameworks. In some embodiments, more than one type of metal may be used within the same covalent-organic frameworks.

The covalent-organic frameworks of the present disclosure can also include various types of aromatic linkers. For instance, in some embodiments, the aromatic linkers include, without limitation, pyrenes. In some embodiments, the pyrenes include, without limitation, pyrenetetraone.

Aromatic linkers and metal-coordinated aromatic units can be linked in various manners to form covalent-organic frameworks. For instance, in some embodiments, the aromatic linkers and the metal-coordinated aromatic units are linked through pyrazine rings. In some embodiments, the pyrazine rings include, without limitation, phenazine.

Analytes and Samples

As set forth in more detail herein, the methods of the present disclosure can sense various analytes in various states in numerous samples in various forms. For instance, in some embodiments, the methods of the present disclosure can sense analytes in a state that include, without limitation, a gaseous state, a liquid state, and combinations thereof. In some embodiments, the analytes are in a liquid state. In some embodiments, the analytes are in a gaseous state.

In some embodiments, the analytes are gaseous analytes. In some embodiments, the gaseous analytes include, without limitation, gaseous emissions, gaseous metabolites, gaseous biological signaling molecules, and combinations thereof. In some embodiments, the gaseous analytes include, without limitation, $NH_3$, $H_2S$, $NO$, $NO_2$, and combinations thereof.

In some embodiments, the analytes are ions. In some embodiments, the ions include, without limitation, anions, cations, and combinations thereof. In some embodiments, the ions include, without limitation, $Ca^{2+}$, $Co^{2+}$, $Mg^{2+}$, $Zn^{2+}$, $Pb^{2+}$, $Ni^{2+}$, $Cu^{2+}$, $Na^+$, $K^+$, $NH_4^+$, $CH_3COO^-$, $NO_3^-$, $ClO_4^-$, $Cl^-$, $I^-$, $F^-$, $Br^-$, $SO_4^{2-}$, $S_2O_8^{2-}$, $Cr_2O_7^{2-}$, and combinations thereof.

In some embodiments, the analytes are present in a sample. In some embodiments, the sample can be in various forms. Such forms can include, without limitation, a gaseous form, a liquid form, a solid form, and combinations of such forms.

Exposing, Detecting, and Sensing Analytes

As set forth in more detail herein, the methods of the present disclosure can include various steps and means of exposing an analyte in a sample to an electrode that includes the covalent-organic frameworks of the present disclosure. For instance, in some embodiments, the exposing results in the reversible association of any analyte in the sample with the covalent-organic framework. In some embodiments, the exposing results in the selective association of a specific analyte in the sample with the covalent-organic framework.

Various methods may also be utilized to detect a change in a property of an electrode that includes the covalent-organic frameworks of the present disclosure. For instance, in some embodiments, the detected change in the property of the electrode is a change in normalized conductance. In some embodiments, the change in normalized conductance is characterized by the following formula: $-\Delta G/G_0 = -(I_0-I)/I_0 \cdot 100\%$, where $-\Delta G/G_0$ represents normalized conductance, $I_0$ represents initial current, and $I$ represents current at various points during measurement.

In some embodiments, the detected change in the property of the electrode is a change in the potential of the electrode. In some embodiments, the change in the potential of the electrode is detected by sensing a change in voltage of the electrode over time.

Various methods may also be utilized to correlate a change in a property of an electrode to the presence or absence of an analyte in a sample. For instance, in some embodiments, the change in a property of the electrode is correlated to the presence or absence of an analyte by comparing the change in the property to the change in property of the electrode in response to known analytes. In some embodiments, the change in a potential of the electrode is correlated to the presence or absence of an analyte by comparing the change in the potential to potentiometric slopes of known analytes.

In some embodiments, the sensing of analytes only includes detecting the presence or absence of the analyte in a sample. In additional embodiments, the sensing also includes detecting the concentration of the analyte.

In some embodiments, the methods of the present disclosure can sense analytes in a sample at a low concentration. For instance, in some embodiments, the methods of the present disclosure can sense analytes at concentrations of less than 500 parts-per-billion (ppb). In some embodiments, the methods of the present disclosure can sense analytes at concentrations of less than 250 ppb. In some embodiments, the methods of the present disclosure can sense analytes at concentrations of less than 100 ppb. In some embodiments, the methods of the present disclosure can sense analytes at concentrations of less than 75 ppb. In some embodiments, the methods of the present disclosure can sense analytes at concentrations of less than 50 ppb. In some embodiments, the methods of the present disclosure can sense analytes at concentrations of less than 25 ppb. In some embodiments, the methods of the present disclosure can sense analytes at concentrations of less than 10 ppb. In some embodiments, the methods of the present disclosure can sense analytes at concentrations of less than 5 ppb.

Covalent-Organic Framework Structures

The covalent-organic frameworks of the present disclosure can have numerous structures. For instance, in some embodiments, the covalent-organic frameworks of the present disclosure are in the form of a fully aromatic and conjugated structure. In some embodiments, the covalent-organic frameworks are in the form of a two-dimensional (2D) conductive network. In some embodiments, the covalent-organic frameworks are in a crystalline form. In some embodiments, the covalent-organic frameworks are in the form of a layered structure.

In some embodiments, the covalent organic frameworks of the present disclosure exhibit a nanosheet morphology with regular and/or parallel lines. In some embodiments, the covalent organic frameworks exhibit nanoribbon structures with grids and/or parallel lines.

In some embodiments, the covalent-organic frameworks of the present disclosure are in the form of planar sheets. In some embodiments, the covalent-organic frameworks are in the form of rods (e.g., rods with lengths of several micrometers and widths of hundreds of nanometers). In some embodiments, the covalent-organic frameworks have a square-like cage structure. In some embodiments, the covalent-organic frameworks have lattices with Lieb topology.

In some embodiments, the covalent-organic frameworks of the present disclosure are porous structures. In some embodiments, the covalent-organic frameworks of the present disclosure include a plurality of micropores. In some embodiments, pores of the porous structures include lengths ranging from about 1.0 nm to about 5.0 nm. In some embodiments, the pores have lengths ranging from about 2.0 nm to about 3.0 nm. In some embodiments, the pores have lengths ranging from about 1.0 nm to about 2.5 nm. In some embodiments, the pores have lengths ranging from about 2.0 nm to about 2.5 nm. In some embodiments, the pores have lengths of about 2.17 nm.

The pores of the covalent organic frameworks of the present disclosure can have various shapes. For instance, in some embodiments, the pores of the covalent-organic frameworks are in the form of square apertures.

Covalent-Organic Framework Properties

The covalent-organic frameworks of the present disclosure can have various advantageous properties. For instance, in some embodiments, the covalent-organic frameworks of the present disclosure exhibit high conductivities. In some embodiments, the covalent-organic frameworks of the present disclosure have bulk conductivities higher than $1\times10^{-2}$ S/m. In some embodiments, the covalent-organic frameworks of the present disclosure have bulk conductivities higher than $1\times10^{-3}$ S/m. In some embodiments, the covalent-organic frameworks of the present disclosure have bulk conductivities higher than $2\times10^{-3}$ S/m. In some embodiments, the covalent-organic frameworks of the present disclosure have bulk conductivities of at least $2.5\times10^{-3}$ S/m.

Electronic Devices

The covalent-organic works of the present disclosure may be utilized as various components of various electronic devices. For instance, in some embodiments, the covalent-organic frameworks can be utilized as components of an electrode. In some embodiments, the electrode includes, without limitation, carbon electrodes, glassy carbon electrodes, gold electrodes, solid contact electrodes, and combinations thereof.

In some embodiments, the covalent-organic frameworks of the present disclosure are positioned on an electrode surface. In some embodiments, the covalent-organic frameworks serve as the electrode surface.

In some embodiments, the electrodes that contain the covalent-organic frameworks of the present disclosure also include additional components. Such additional components can include, without limitation, wirings, a potentiostat, an output display, and combinations of such components. In some embodiments, the wiring electrically connects the electrode surface to the potentiostat. In some embodiments, the output display is electrically connected to the potentiostat.

Electrodes that contain the covalent-organic frameworks of the present disclosure can be associated with various electronic devices. For instance, in some embodiments, the electrodes are associated with chemiresistive devices.

Methods of Making Covalent-Organic Frameworks

Additional embodiments of the present disclosure pertain to methods of making the covalent-organic frameworks of the present disclosure. In some embodiments, such methods involve the conjugation of metal-coordinated aromatic units through the utilization of aromatic linkers. In some embodiments, the conjugation occurs through aromatic annulation. In some embodiments, the conjugations results in the formation of pyrazine rings.

In some embodiments, the conjugation occurs by mixing metal-coordinated aromatic units and aromatic linkers in an acidic solution. In some embodiments, the acidic solution contains sulfuric acid.

In some embodiments, the mixing of metal-coordinated aromatic units and aromatic linkers also involves heating. For instance, in some embodiments, the mixing occurs at temperatures above 100° C. In some embodiments, the mixing occurs at temperatures above 150° C. In some embodiments, the mixing occurs at temperatures above 200° C.

In some embodiments, the methods of the present disclosure also include a step of associating the formed covalent-organic frameworks of the present disclosure with a component of an electronic device. For instance, in some embodiments, the formed covalent-organic frameworks may be associated with a surface of an electrode.

Various methods may be utilized to associate covalent-organic frameworks with an electronic device component. For instance, in some embodiments, the covalent-organic frameworks of the present disclosure are associated with an electronic device component by methods that include, without limitation, drop casting, sputtering, spraying, and combinations thereof.

In some embodiments, the covalent-organic frameworks of the present disclosure can be formed at the same time as their association with an electronic device component. For instance, in some embodiments, the conjugation of metal-coordinated aromatic units through the utilization of aromatic linkers can occur on a surface of an electrode material in order to form chemiresistive devices.

Applications and Advantages

In some embodiments, the present disclosure describes the development of compositionally novel and intrinsically conductive covalent organic frameworks through the full aromatic annulation of metal-coordinated aromatic units (e.g., octaamino-nickelphthalocyanine) and aromatic linkers (e.g., pyrenetetraone). In some embodiments, the porous and conductive attributes of the covalent organic frameworks of the present disclosure exhibit optimal chemiresistive responses to gases, including $NH_3$, $H_2S$, NO, and $NO_2$.

The present disclosure provides at least three important advancements in the development of conductive and two-dimensional porous materials. First, the covalent organic frameworks of the present disclosure provide a compositionally novel material which links metal-coordinated aromatic units (e.g., metallophthalocyanine units) within planar two-dimensional sheets using extremely robust and chemically stable aromatic linkers (e.g., conjugated linkers, such as pyrene). In some embodiments, this unique modular design yields a bulk conductivity of $2.51 \times 10^{-3}$ S/m, which constitutes the highest value obtained for an intrinsically conductive covalent organic framework.

Second, Applicants demonstrate the first use of covalent organic framework-based chemiresistive electronic devices for detection of various reducing and oxidizing gases. For instance, as described in more detail in the Examples herein, Applicants have demonstrated that the chemiresistive devices of the present disclosure can show promising responses for gaseous analyte sensing, including $NH_3$ and NO.

Third, Applicants envision that the covalent organic frameworks of the present disclosure will offer access to multi-functional properties (e.g., porosity, conductivity, magnetism, and catalytic ability) within an extremely stable chemical scaffold. For instance, Applicants envision that embedded metal-coordinated aromatic units (e.g., metallophthalocyanine units) with their modular metal center can provide the possibility to develop a versatile platform to tune the surface chemistry, conductivity and magnetic properties of the resulting materials. Moreover, Applicants envision that the chemical stability of the covalent organic frameworks of the present disclosure will provide significant advantages in material stability under harsh chemical conditions.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

EXAMPLE 1

Two-Dimensional Chemiresistive Covalent Organic Framework with High Intrinsic Conductivity This Example describes the synthesis of a novel intrinsically conductive two-dimensional (2D) covalent organic framework (COF) through the aromatic annulation of 2,3,9,10,16,17,23,24-octa-aminophthalocyanine nickel(II) and pyrene-4,5,9,10-tetraone. The intrinsic bulk conductivity of the COF material (termed COF-DC-8) reached $2.51 \times 10^{-3}$ S/m, and increased by three orders of magnitude with $I_2$ doping. Electronic calculations revealed an anisotropic band structure, with the possibility for significant contribution from out-of-plane charge-transport to the intrinsic bulk conductivity. Upon integration into chemiresistive devices, this conductive COF showed excellent responses to various reducing and oxidizing gases, including $NH_3$, $H_2S$, NO, and $NO_2$, with parts-per-billion (ppb) level of limits of detection (LOD for $NH_3$=70 ppb, for $H_2S$=204 ppb, for NO=5 ppb, and for $NO_2$=16 ppb based on 1.5 min exposure). Electron paramagnetic resonance spectroscopy and X-ray photoelectron spectroscopy studies suggested that the chemiresistive response of the COF-DC-8 involves charge transfer interactions between the analyte and nickelphthalocyanine component of the framework.

EXAMPLE 1.1

Introduction

The development of chemically robust, porous, and electrically conductive nanomaterials drives progress in electronic devices, energy storage, catalysis, and chemical sensing. Recent advances in the synthesis of electrically conductive metal-organic frameworks (MOFs) have enabled a range of applications in electrocatalysis, energy storage, and chemical sensing that were previously inaccessible using traditionally insulating MOFs. Both through-bond and through-space charge transport mechanisms have proven to be effective in promoting conductivity in MOFs. In particular, the molecular design strategy focusing on planar two-dimensional MOFs, in which the formation of π-d conjugated sheets can promote the delocalization of charge, has yielded metallic conductivities. Despite progress in the development of conductive MOFs, the design and synthesis of electrically conductive π-conjugated covalent organic frameworks (COFs) connected by chemically robust bonds—which arguably possess superior chemical stability to frameworks derived from reversible coordination chemistry and borate or Schiff-base chemistry—has remained a tremendous challenge. Although doping of COFs with oxidants and guest molecules has led to conductivities of $\sim 10^{-2}$ to $10^{-1}$ S/m, access to intrinsically conductive COFs with high bulk conductivity remains limited.

Capitalizing on the general principles of molecular engineering for other classes of conductive materials (e.g., conductive organic polymers, conductive organic molecular solids, and conductive coordination polymers), the strategy for maximizing the intrinsic bulk conductivity of COFs can leverage through-bond and through-space charge transport characteristics. To achieve through-bond charge transport, the covalent linkages formed during COF synthesis must promote efficient charge delocalization. Previous studies on one-dimensional (1D) and two-dimensional (2D) conjugated polymers with single bonds in their backbones rarely showed high charge carrier mobility values, suggesting that borate and imine linkages in typical COFs may be inefficient at facilitating through-bond charge transport.

While full annulation of building blocks through aromatic linkages has been established as a promising strategy for conjugated 2D COF formation, it has not yet yielded materials with high intrinsic conductivities. Interestingly, recent studies highlighted the unique role of topology in enhancing through-bond charge delocalization in conjugated 2D COFs, with Lieb lattice being more favorable over Kagome lattice. A complementary strategy for achieving through-space transport requires maximizing orbital interactions within the resulting layered framework structure through strategic choice of building blocks.

Although several reports have taken advantage of π-stacking for designing COF-based materials with reasonable charge carrier mobilities (8.1 $cm^2$ $V^{-1}$ $s^{-1}$), their bulk conductivities remained limited. Applicants reasoned that by simultaneously capitalizing on both molecular design strategies of through-bond and through-space transport in a highly planar, two-dimensional, fully conjugated material based on a Lieb lattice may lead to the realization of a high intrinsic bulk electrical conductivity within a COF-based material.

Figure 2:
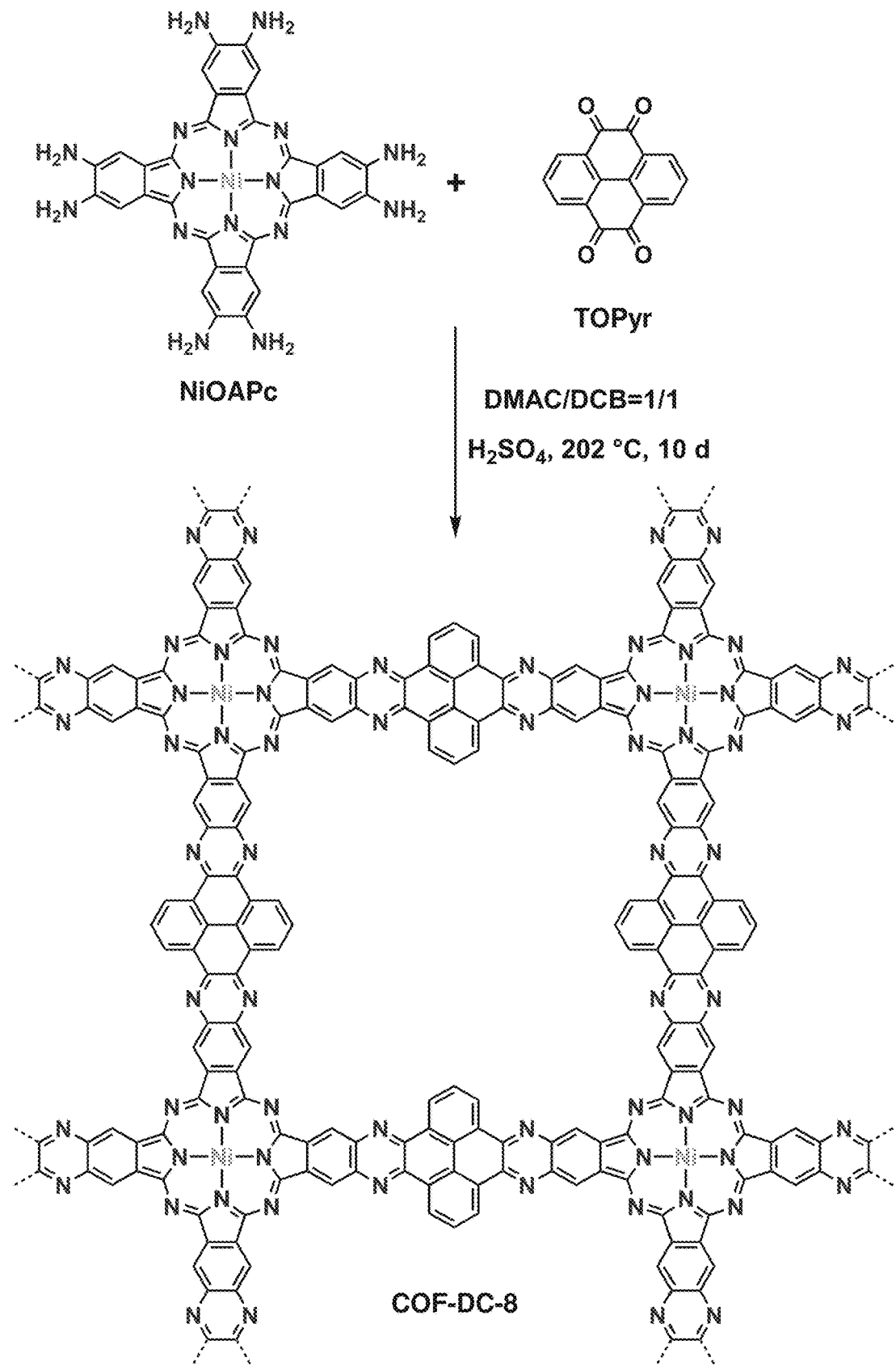
FIG. 2 illustrates a synthetic route for two-dimensional (2D) conductive COF material, termed COF-DC-8, with nickelphthalocyanine and pyrene subunits connected by pyrazine rings.

This Example describes the development of a novel intrinsically conductive COF (COF-DC-8) through the condensation reaction between the highly planar conjugated building blocks: octaamino-derived nickelphthalocyanine (NiOAPc) and pyrenetetraone (TOPyr). The annulation of tetraketone and octaamine precursors to form pyrazine rings generates a fully aromatic conjugated framework structure with square apertures (FIG. 2). The utilization of the nickelphthalocyanine core was inspired by its application in the construction of conductive frameworks materials demonstrated by Applicants' group and others, as well as its affinity to small molecules. The resulting fully conjugated 2D lattice with Lieb topology can maximize through-bond charge delocalization, while the stacking of the embedded metallophthalocyanine units confined within the rigid framework material can efficiently promote out-of-plane charge transfer. The bulk conductivity—which characterizes the weighted average of contributions from through-bond and through-space charge delocalization in polycrystalline COF-DC-8—reached $2.51 \times 10^{-3}$ S/m, representing the highest bulk conductivity achieved within an intrinsically conductive COF.

Chemiresistive devices made from this conductive COF showed excellent responses and ultra-low limits of detection for gaseous analytes (1.5 min exposure-based LODs: 70 ppb for $NH_3$, 204 ppb for $H_2S$, 5 ppb for NO, and 16 ppb for $NO_2$). Increases in resistance towards reducing gases and decreases in resistance towards oxidizing gases were consistent with p-type semiconductive character of the COF.

Spectroscopic characterization using electron paramagnetic resonance (EPR) and X-ray photoelectron spectroscopy (XPS) suggested that the chemiresistivite response of COF-DC-8 originates from the combination of binding and charge transfer interactions between the analyte and the Ni-containing phthalocyanine component of the framework. The promising chemiresistive performance highlights the potential application of this modular class of materials in the fabrication of electronic devices and chemical sensors.

EXAMPLE 1.2

Synthesis and Characterization

As illustrated in FIG. 2, the condensation reaction performed in a mixed solvent of dimethylacetamide (DMAC) and o-diclorobenzene (DCB) in the presence of sulfuric acid for 10 days gave the desired COF-DC-8 as a dark green powder. Microwave heating significantly reduced the reaction time to 10 hours, albeit at the expense of slightly diminished crystallinity. Efforts to optimize reaction conditions yielded several alternative approaches for accessing COF-DC-8, including the use of the aqueous solution of acetic acid in a mixed solvent system of DMAC and DCB, and the use of NMP as the solvent in the presence of sulfuric acid or aqueous solution of acetic acid.

Fourier-transform infrared spectroscopy of COF-DC-8 showed the appearance of characteristic absorption bands of the phenazine system at 1518, 1431, and 1351 $cm^{-1}$, while absorption bands of C=O and —$NH_2$ groups from NiOAPc and TOPyr were absent, indicating the formation of phenazine linkages. XPS showed characteristic bands for the K-edge of carbon (285.9 eV) and nitrogen (398.6 eV) in C=N bond, indicating the presence of $sp^2$-hybridized nitrogen atoms. Elemental analysis showed that C:N:Ni ratios were consistent with theoretical values, although the absolute percentages of C, N, and Ni were slightly lower than theoretical values. The discrepancy between the theoretical and observed values could be from the existence of unreacted C=O and $NH_2$ groups at sheet edges and the entrapment of small-molecule volatiles (acetone, $H_2O$, or DMAC) included in the pores, as suggested by XPS and TGA analysis.

Figure 3A:
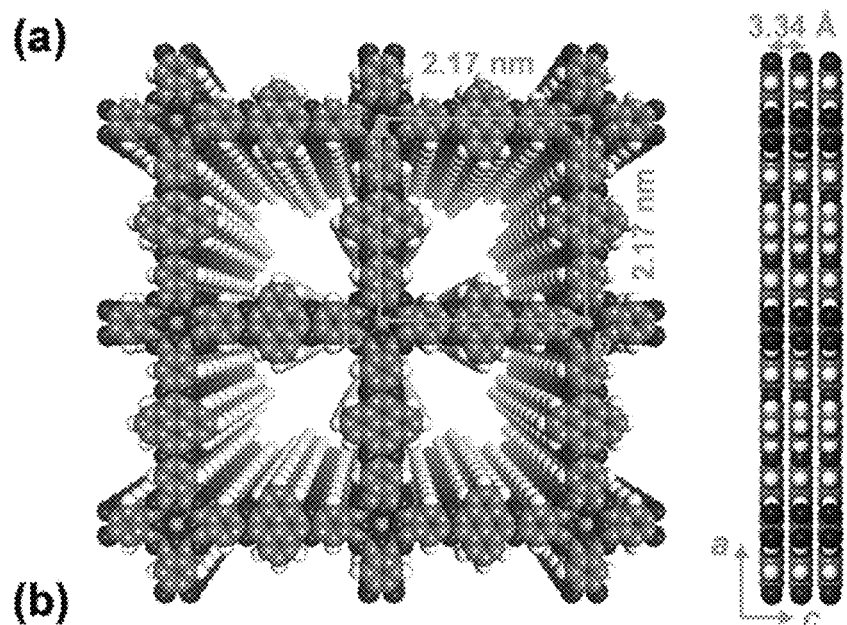
FIGS. 3A, 3B, 3C, and 3D illustrate the structure and characterization of COF-DC-8.
Figure 3B:
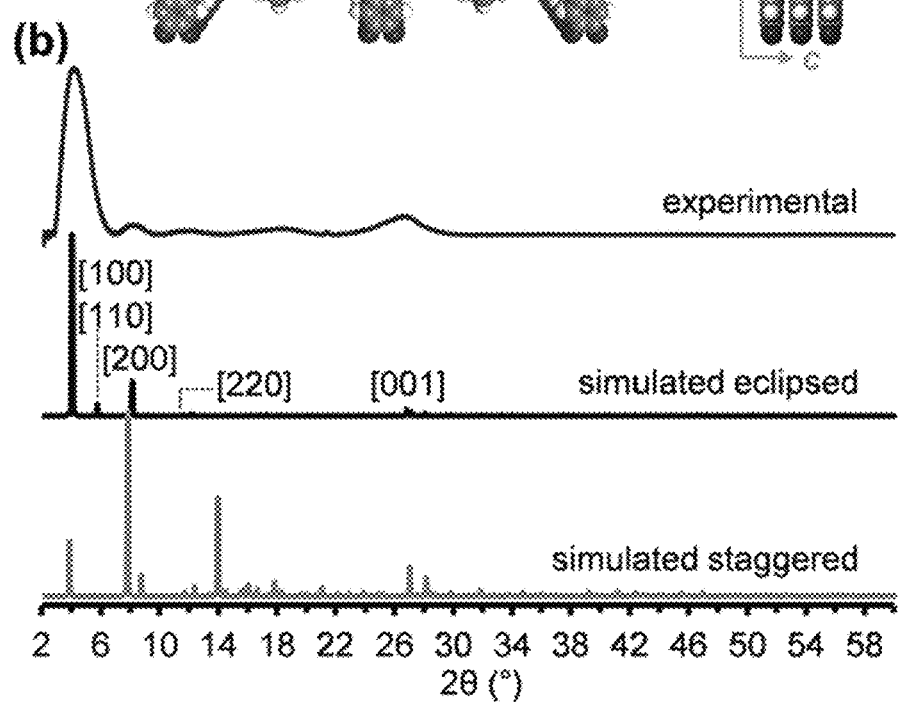
Figure 4A:
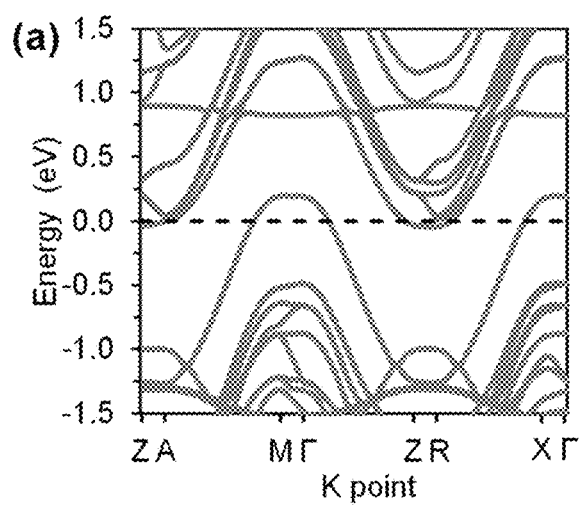
FIGS. 4A and 4B illustrate calculated electronic band structure of COF-DC-8 (FIG. 4A) and the corresponding first Brillouin zone (FIG. 4B).
Figure 4B:
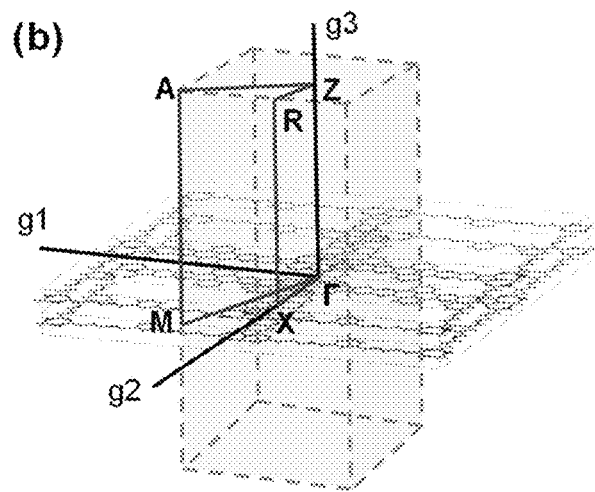

Powder X-ray diffractometry (PXRD) further supported the formation of the desired framework formed under optimized reaction conditions (FIGS. 3A-3B). Prominent peaks were observed at 2θ=4.06°, 8.19°, 11.48°, 12.26°, and 26.65°, that were assigned to the [100], [200], [220], [300], and [001] facets, respectively (FIG. 3B). Although PXRD displayed peak broadening which was possibly due to small crystallite size, the peak intensity and position were sufficient for confirming the framework structure and key cell parameters of DC-COF-8. The strong diffractions from the [100] and [200] facets indicated long-range order within the ab plane of the structure. The Ni-to-Ni distance on the side of the square, based on those two diffractions, was calculated to be 2.17 nm. The presence of the [001] facet at 26.65° suggested the structural ordering with a 3.34 Å separation of layers along the c axis perpendicular to the 2D sheets. These results were consistent with the structure optimized by DFT calculations with generalized gradient approximation functional. The experimental PXRD was in good agreement with the simulated fully eclipsed AA-stacking model with a space group of P4/MMM characterized by cofacial stacking of metallophthalocyanine units in adjacent layers; in contrast, the staggered model with an offset by distances of a/2 and b/2 did not match the experimental PXRD pattern (FIG. 4B).

Figures 3C, 3D:
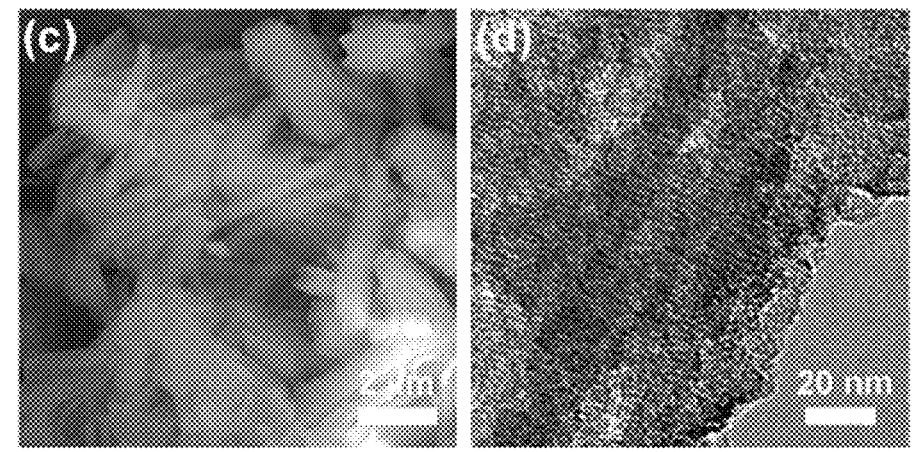

Scanning electron microscopy (SEM) revealed the presence of rod-shaped crystallites with lengths ranging from hundreds of nanometers to several micrometers and widths of hundreds of nanometers (FIG. 3C). Transmission electron microscopy (HR-TEM) provided visualization of a layered morphology (FIG. 3D). The presence of regular lines with a spacing of ~2.2 nm in TEM (FIG. 3D) was consistent with the interatomic distances of the [100] plane inferred from PXRD and computational models. COF-DC-8 exhibited reversible nitrogen sorption isotherm curves with a Brunauer-Emmett-Teller surface area of 360 $m^2$ $g^{-1}$. The pore-size distribution profile gave an accessible pore size of 1.7 nm. Thermogravimetric analysis showed excellent thermal stability of COF-DC-8 with only a total 10% of mass loss upon heating to 510° C. COF-DC-8 maintained its crystallinity when treated with 12 M HCl and 14 M KOH for 24 h, confirming its chemically robust skeleton.

EXAMPLE 1.3

Electronic Properties

The electrical conductivity of COF-DC-8 was measured using a four-point probe method on a pressed pellet with a thickness of 1.0 mm. The bulk conductivity of COF-DC-8 was determined to be $2.51 \times 10^{-3}$ S/m at 298 K, which is several orders of magnitude higher than small-molecule nickel phthalocyanine and a large number of other organic solids, and is also significantly higher than many undoped conjugated polymers ($10^{-4}$-$10^{-8}$ S/m) and other pristine semi-conductive COFs. The Arrhenius fit to variable-temperature current measurements revealed an activation energy of 324 meV for the transport of charge carriers in COF-DC-8. Nearly a $10^3$-fold improvement in conductivity was achieved by doping the COF with a gaseous stream of 12 (~400 ppm in $N_2$) within 5 minutes of exposure at room temperature.

DFT calculations were performed to gain insight into the electronic structure of the COF. The Dirac bands crossed the Fermi level in both A-M, Γ-Z, and R-X directions and exhibited wide band dispersions of more than 0.5 eV, suggesting the intrinsically conductive nature of COF-DC-8. The high symmetry points in the first Brillouin zone of COF-DC-8 showed that the bands crossed the Fermi level through the out-of-plane directions (FIG. 4A). In contrast, the in-plane direction, including Γ-M, Z-R, Γ-M and Z-A of the material, exhibited moderate band gaps ranging from 0.5-1.0 eV. These results suggested that the charge transport in COF-DC-8 may be anisotropic and that a significant mechanism contributing to the bulk conductivity may be through pathways along the c-axis. The computed through space charge-transport property is consistent with those found in other phthalocyanine- and porphyrin-based COFs, that exhibited high carrier mobility along the direction of the stacking due to the formation of periodic π-columns. Applicants hypothesize that the eclipsed stacking mode of COF-DC-8 has the potential to amplify the alignment of the π-conjugated units and enhance the through-space metallophthalocyanine-to-metallophthalocyanine charge transport along the 2D stacks. Since the experimental validation of these calculations would require access to highly oriented nanosheets and nanowires of the COF, the polycrystalline material—which was the focus of this Example—was not suitable for confirming these calculations experimentally.

EXAMPLE 1.4

Chemiresistivity of COF-DC-8

2D COFs are highly appealing for the fabrication of electronic devices by virtue of their well-defined lattice with π functionality, large surface-to-volume ratio, and chemically robust skeleton. However, the poor to modest conductivity of existing 2D COFs has limited their use in electronic devices and other applications. Given the good electrical conductivity and the ability of the built-in nickelphthalocyanine units to bind a wide range of analytes through coordination with the metal center, Applicants tested the chemiresistive response of COF-DC-8 towards a series of gases with different reducing and oxidizing abilities, including $NH_3$, $H_2S$, NO, and $NO_2$. These gases constitute well-known toxic pollutants and are also biological signaling molecules. To make chemiresistive devices, a COF suspension was drop casted onto interdigitated electrodes, which gave devices with resistances in the range of kΩ. The devices were tested under a constant applied voltage of 1.0 V, and the current was monitored using a potentiostat.

Upon exposure to 40 ppm of $NH_3$ (balance gas $N_2$) for 30 min, COF-DC-8 showed a normalized response ($-\Delta G/G_0$) of 39±1% (FIG. 5A). This positive change in resistance of COF-DC-8 in response to $NH_3$, which typically serves as an electron donor, suggested that COF-DC-8 behaved as a p-type semiconductor. A response of 62±1% was observed to 40 ppm of $H_2S$ (FIG. 5A). The higher response to $H_2S$, compared to $NH_3$, may be due to the stronger interaction between the material and $H_2S$. This response value was comparable with chemiresistive devices employing hexahydroxytriphenylene-based MOF and metallophthalocyanine-based bimetallic MOF. In contrast to the positive responses to $NH_3$ and $H_2S$, COF-DC-8 exhibited negative response to both NO and $NO_2$ (FIG. 5B), which further reinforced the p-type character of COF-DC-8. The exposure of the COF to 40 ppm NO generated a high response of 3939±317% (FIG. 5C). This remarkable response to NO was more than 10 times higher than that produced by triphenylene-based conductive MOFs. An even higher response of −6338±479% was generated after the 30 min exposure of 40 ppm of $NO_2$ (FIG. 5D). This modulation of electrical conductivity of this COF by chemical doping with low-concentrations of small reactive gases has promising implications for developing advanced electronics where rectification of conductance is required.

EXAMPLE 1.5

Determination of LODs

Concentration-dependent studies (FIGS. 5A-5D) enabled quantitative correlations between changes in response as a function of analyte concentration for COF-DC-8. Although the response values were distinguishable at [$NH_3$]=2-80 ppm, only a relatively narrow linear range of 2-10 ppm could be identified (FIG. 5E). The LOD value for $NH_3$ determined from the response-concentration relationship in the linear range was 70 ppb based on 1.5 min exposure. Compared with $NH_3$, COF-DC-8 showed a wider liner range of 5-80 ppm for $H_2S$ that persisted across different exposure times ranging from 1.5 min to 30 min (FIG. 5F). The LOD derived for $H_2S$ detection was 204 ppb based on response values after 1.5 min exposure to the analyte. The calculated LOD values for both $NH_3$ and $H_2S$ showed minimal dependence on exposure time with only slight changes observed for exposure time differences in the range of 1.5 min to 30 min (70-57 ppb for $NH_3$, 204-121 ppb for $H_2S$).

Excellent linear response-concentration relationships ($R^2$=0.98-0.99) were observed for NO and $NO_2$ at relatively wide concentration ranges of 0.02-40 ppm for NO and 2-40 ppm for $NO_2$ (FIGS. 5G, 5H). The striking sensitivity of COF-DC-8 led to ultra-low LODs of 5 and 16 ppb for NO and $NO_2$, respectively, based on responses after 1.5 min exposure. Compared with those found for $NH_3$ and $H_2S$, significant exposure-time dependences were found for the LOD values of NO and $NO_2$. Longer exposure times led to sub-ppb level of calculated LODs.

EXAMPLE 1.6

Recovery of Device Performance

Sensors characterized by high reversibility in response under repeated exposures to analyte are advantageous for their reusability. While dosimetric devices are highly irreversible when cycled through analyte exposures, they are advantageous to allow a historical record of total exposure events. The response of COF-DC-8 to $NH_3$ was partially reversible in the concentration range from 5 to 80 ppm (FIG. 5A). Full reversibility was observed when the concentration was below 2 ppm. Across the entire tested concentration range (2-80 ppm) for $H_2S$, only slight reversibility (5%-15%) was observed (FIG. 5B). The response to both NO and $NO_2$ showed partial reversibility (7%-33% for NO and 25%-45% for $NO_2$, FIG. 5C and FIG. 5D). These observations demonstrated the dosimetric or quasi-dosimetric characteristics of COF-DC-8 to $H_2S$, NO, and $NO_2$, in which the response was dependent on the dosing history.

In order to investigate the reusability of the devices, the analyte-exposed COF devices were reactivated by both thermal recovery and solvent recovery. After solvent recovery by immersing in deionized water for 1 hour, the responses of devices were largely restored (108% for $H_2S$, 71% for NO, and 100% for $NO_2$). However, the devices were only partially restored (60% for $H_2S$, 14% for NO, and 17% for $NO_2$) their performance after thermal recovery by heating at 60° C. for 18 h under ~20 mTorr. These results were consistent with the previous report showing that, in metal-organic frameworks, washing was more efficient than heating for recovery of device performance. The recovery tests suggested that analyte molecules bound by the material may be released from the surface under aqueous conditions, thus restoring the sensing ability of the COF-DC-8 device.

EXAMPLE 1.7

Analysis of Sensing Kinetics

The rate and magnitude of the chemiresistive response is usually governed by several factors, including the characteristics of the sensing apparatus, the morphology and preferential orientation of the material, and the electronic nature of the analyte. Analyzing the rate of response at the initial stage upon analyte exposure is a convenient technique that can allow rapid concentration-dependent measurements and convenient assessment of sensing kinetics when factors of the sensing apparatus and material characteristics are kept constant.

Through the analysis of the initial rate of response, Applicants found that COF-DC-8 could differentiate certain analytes and their concentrations quantitatively within only 1 minute of initial analyte exposure (FIGS. 6A and 6B). Plotting the slope of initial response over the first 1 min of exposure versus the concentration of the four gases provided a linear relationship, which, in most cases, extended into much wider concentration ranges compared with those found in direct response-concentration analysis. This method provided a simple and fast analysis of the concentration of the four analytes.

Each of the four gases showed distinct dynamics of response at wide concentration range. Under the concentration of 40 ppm, the rate of the initial response for $NH_3$ was 48±5% $min^{-1}$, while the initial response for $H_2S$ showed a slower rate of 18±3% $min^{-1}$. Compared with reducing gases $NH_3$ and $H_2S$, COF-DC-8 showed much quicker response for NO and $NO_2$ at the initial state with rates at 513±53% $min^{-1}$ and 171±8% $min^{-1}$, respectively. This observation indicated that the initial rate of response was strongly dependent on type of the analyte-material interaction.

EXAMPLE 1.8

Sensing Mechanism

To investigate the sensing mechanism, spectroscopic analysis using EPR and XPS was performed. EPR analysis was carried out in the X-band at 77 K under $N_2$ atmosphere on COF samples before and after they were exposed to analytes (1% $NH_3$, $H_2S$, NO, and $NO_2$) for 1 hour. XPS analysis was carried out on analyte-exposed samples prepared by a similar procedure with those for EPR analysis, which were subsequently mounted on copper tape and analyzed under reduced pressure of ~$10^{-7}$ Torr.

Figure 7A:
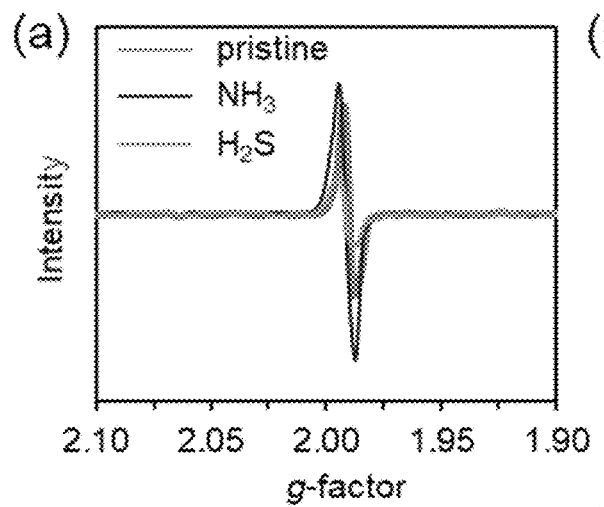
FIGS. 7A, 7B, 7C, and 7D illustrate electron paramagnetic resonance (EPR) spectrum of COF-DC-8 before (dashed lines) and after dosing (solid lines) with (FIG. 7A) $NH_3$ and $H_2S$, and (FIG. 7B) NO and $NO_2$. For comparison, the intensity of the peaks has been normalized based on the peak intensity before analyte dosing.

The EPR spectrum of pristine COF-DC-8 showed a ligand centered radical at g=1.99, which was likely due to the chemisorption of $O_2$ on the Ni center that induces unpaired radicals because of the charge transfer from the phthalocyanine ligand to $O_2$ molecule. After $NH_3$ exposure, only a 15% intensity increase in EPR signal was observed (FIG. 7A). No obvious change was detected on both the XPS spectra of C 1s, N 1s, and Ni 2p. These results suggested that the interaction between $NH_3$ and COF-DC-8 may be dominated by reversible and weak charge transfer interactions under tested conditions.

After dosing COF-DC-8 with $H_2S$, Applicants observed a significant decrease in peak intensity of 70% in the EPR signal (FIG. 7A). This observation may be consistent with the replacement of surface-bound $O_2$ by $H_2S$ at the Ni centers. By XPS, clear emission lines at binding energies of 163.8 eV and 165.1 eV (FIG. 7C) were detected, that were similar to S $2p_{1/2}$ and S $2p_{3/2}$ peaks found in metal sulfides, which indicated the formation of Ni-S bond. Moreover, a prominent peak at a higher binding energy of 167.5 eV, consistent with the formation of sulphite species, was also observed. This observation suggested that the Ni-bound $H_2S$ may be further transformed into species with higher oxidation states, likely with the participation of surface adsorbed $O_2$ through a catalytic oxidation reaction. This type of irreversible transformation is consistent with the negligible recovery in response after $H_2S$ exposure shown in FIG. 5B.

Figure 7B:
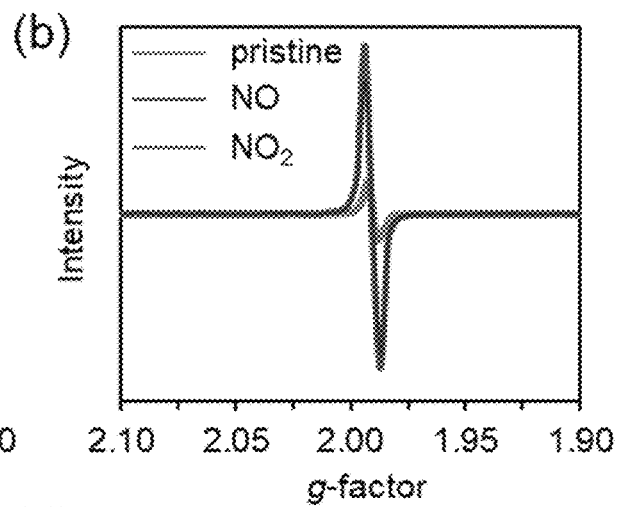
Figure 7C:
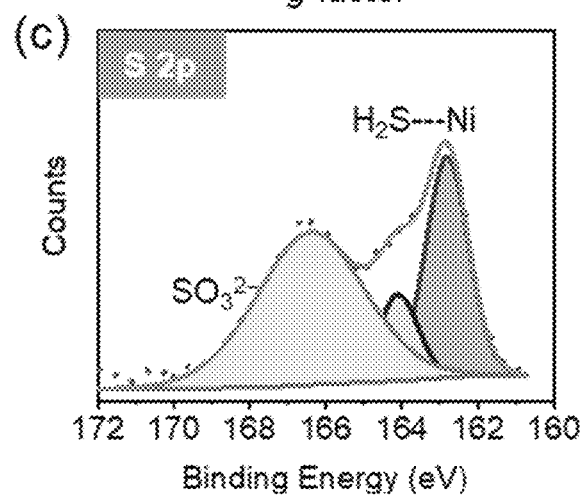
Figure 7D:
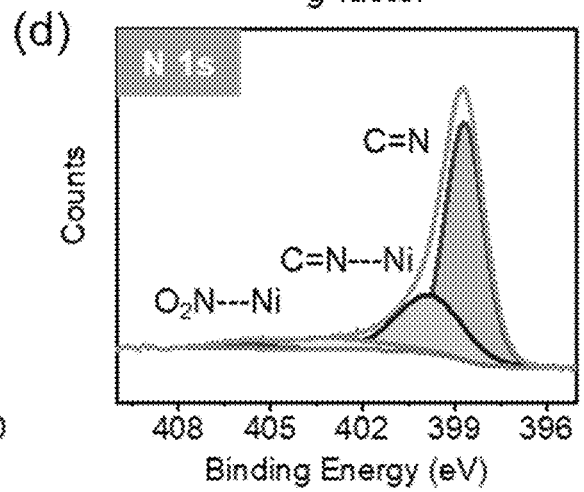

After the exposure of the COF to oxidizing gases, prominent increases of 3.2- and 4.2-fold in the EPR signals were found after NO and $NO_2$ exposure, respectively (FIG. 7B). No significant changes were observed for the XPS spectra of Ni 2p, indicating that the oxidation state of the Ni centers was not altered. After NO dosing, a new component corresponding to N is appeared at the binding energy of 402.0 eV, which was absent in the pristine material. Based on the previous studies of NO adsorption on metal surfaces, this component was assigned as a Ni-bound NO species. After $NO_2$ dosing, a weak, yet clear, peak was observed at the binding energy of 406.1 eV (FIG. 7D). Through the comparison with spectra of $NO_2$ adsorbed on metallophthalocyanines and metal oxides, this peak suggested the existence of $NO_2$ molecules which were likely coordinated to the Ni center. Taken together, the EPR and XPS results suggest that surface adsorption and charge transfer interactions between the analytes and nickelphthalocyanine component of the COF were related to the observed chemiresistive properties of the COF.

EXAMPLE 1.9

Conclusion

In conclusion, Applicants have designed and synthesized a novel intrinsically conductive COF-DC-8 through the aromatic annulation between of 2,3,9,10,16,17,23,24-octaaminophthalocyanine nickel(II) and pyrene-4,5,9,10-tetraone. The reaction between the tetraketone and octaamine allows the formation of pyrazine rings to generate a fully aromatic conjugated structure, and renders the construction of square apertures with a side length of 2.2 nm and excellent chemical and thermal stability. The bulk room temperature conductivity of COF-DC-8 reached $2.51 \times 10^{-3}$ S/m, which is the highest bulk conductivity achieved within an intrinsically conductive COF. Doping with 12 can further increase the bulk conductivity by a factor of $10^3$.

In the first implementation of a conductive COF as active material for chemiresistive devices, COF-DC-8 showed excellent responses toward $NH_3$, $H_2S$, NO, and $NO_2$ with ultra-low limits of detection at ppb level, that is 70 ppb for $NH_3$, 204 ppb for $H_2S$, 5 ppb for NO, and 16 pb for $NO_2$ after only 1.5 min exposure to the analytes. These values are comparable to or superior to the most sensitive sensors based on conductive MOFs. The sensing performance also significantly surpasses that of small-molecule metallophthalocyanines based chemiresistors, considering the high sensitivity and low driving voltage demand of COF-DC-8.

EXAMPLE 2

The Synthesis of MPc-Containing Covalent-Organic Frameworks and Their Applications in Chemical Sensing This Example illustrates the synthesis of additional metallophthalocyanine (MPc)-containing covalent-organic frameworks and their applications in chemical sensing.

Chemicals were purchased from Sigma Aldrich or TCI and used as received. High-Resolution MS was performed at the University of Illinois Urbana-Champaign. NMR spectra were recorded on Bruker 500 and 600 MHz NMR spectrometer. The chemical shifts (δ) were expressed in ppm with internal standard tetramethylsilane (TMS) and solvent signals as internal references, and J values were given in Hz. Standard abbreviations indicating multiplicity were used as follows: s (singlet), br (broad), d (doublet), t (triplet), q (quartet), m (multiplet).

Scanning Electron Microscopy (SEM) and Energy Dispersive X-ray Spectroscopy (EDX) were performed using a Hitachi TM3000 SEM (Tokyo, Japan) equipped for X-ray microanalysis with a Bruker Edax light element Si(Li) detector (Billerica, MA). Transmission electron microscopy was carried out at a Tecnai F20ST FEG TEM instrument. Powder X-ray diffraction (PXRD) measurements were performed with a Rigaku sixth generation MiniFlex X-ray diffractometer with a 600 W (40 kV, 15 mA) CuKa (a==1.54 Å) radiation source.

EXAMPLE 2.1. General Synthesis of MPc-Pyr-COF (M=Fe, Co, Cu)

Synthesis of the MOAPc ligand (M=Fe, Co, Cu). The synthetic scheme toward FeOAPc ligand is shown below in Scheme 1.

Scheme 1

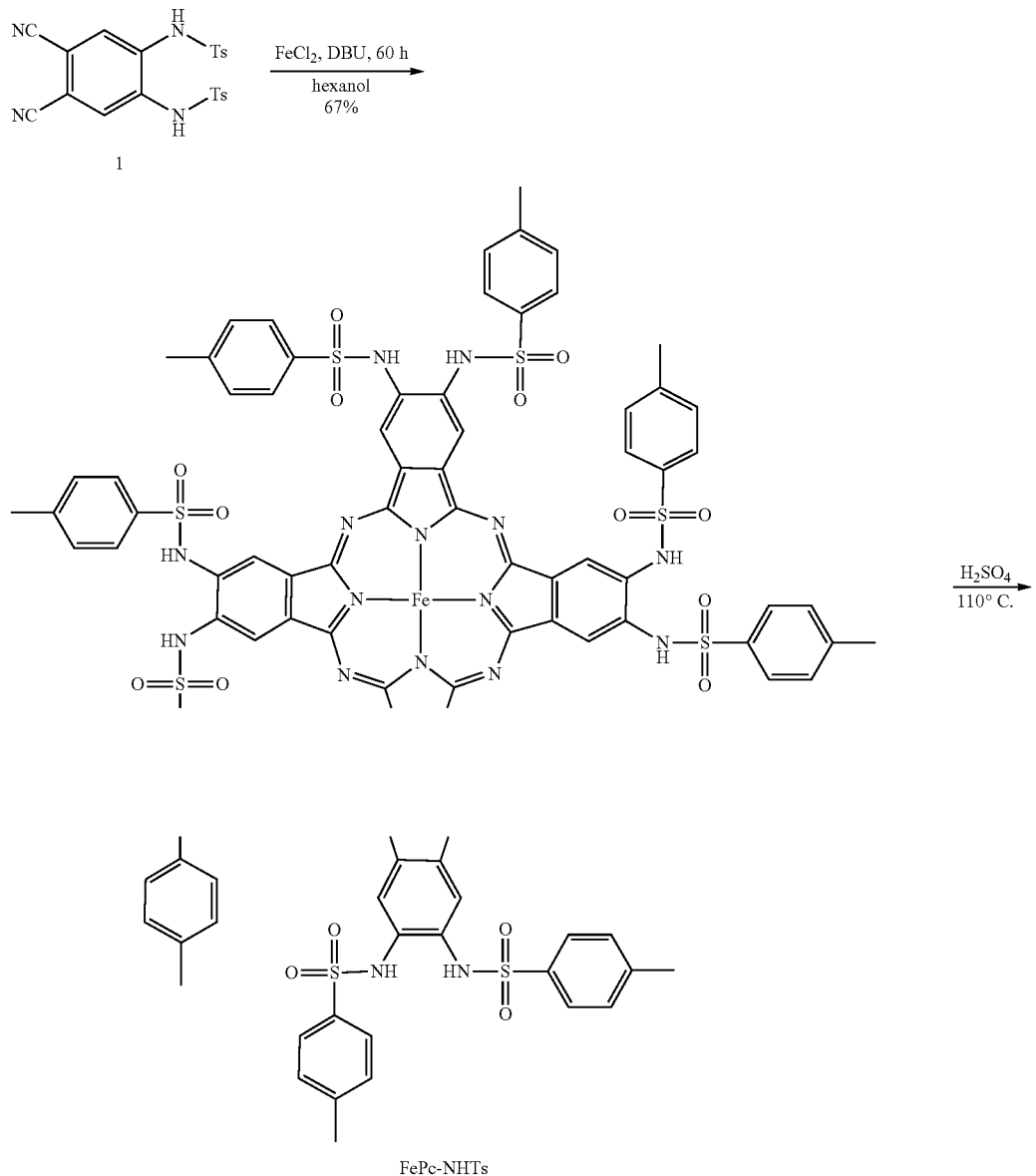

FePc-NHTs

-continued

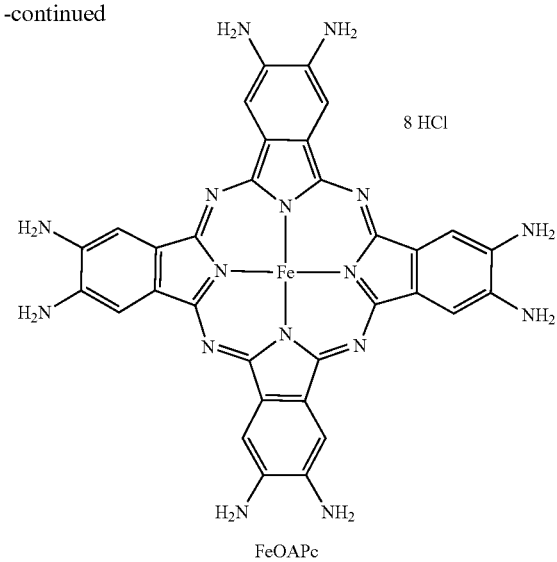

FeOAPc

Synthesis of 2,3,9,10,16,17,23,24-octatosylaminophthalocyanine Fe(II) (FePc-NHTs). The synthesis of the 2,3,9,10,16,17,23,24-octatosylaminophthalocyanine Ni(II) was adapted from the literature. To a suspension of 1.00 g (2.1 mmol) of N,N'-(4,5-dicyano-1,2-phenylene)bis(4-methylbenzenesulfonamide) and 1.12 g of anhydrous $FeCl_2$ (2.1 mmol, 1.0 eq) in n-hexanol (3 mL) in a glass pressure vessel, 2 mL of DBU (1,8-Diazabicyclo[5.4.0]undec-7-ene) was added. The system was purged with $N_2$ for 10 minutes and then sealed. The reaction vessel was then heated at 170° C. for 36 hours. The reaction was then allowed to cool to room temperature. Once at room temperature, the reaction mixture was dissolved in 150 mL of a mixed solvent system of acetic acid and $CH_2Cl_2$ (v/v=1:5). The organic extract was washed with water (200 mL×3) and then evaporated to dryness to provide an emerald-colored oil. The residual hexanol remaining in the oil was removed by repeatedly dispersing in 40 mL of a mixture $CH_2Cl_2$/petroleum ethers (v/v=1:3) and decanting the brownish solvent. The emerald-colored crude product was dissolved in $CH_2Cl_2$ and pyridine and filtered through a fine fitted funnel. The organic mother liquor was evaporated to dryness and re-dissolved in 20 mL MeOH. The pyridine was quenched with conc. HCl (3 mL). Upon addition of HCl a solid was observed to crash out of solution. Filtration produced a fine black powder and a brown-green mother liquor. The solids were further purified by column chromatography (silica gel, eluent: $CH_2Cl_2$/MeOH/pyridine=50/2.5/0.2) to give product FePc-NHTs as a green solid (250 mg, yield 67%). $^1$H-NMR (500 MHz, dimethyl sulfoxide (DMSO)-$D_6$) no proton peaks were observed in low-field NMR experiments. HRMS (ES+): calculated for $C_{88}H_{72}FeN_{16}O_{16}S_8$ 1921.97 [M$^+$], 960.98 [M$^{2+}$]; found 1921.26 M/z, 961.63 m/z.

Figure 8:
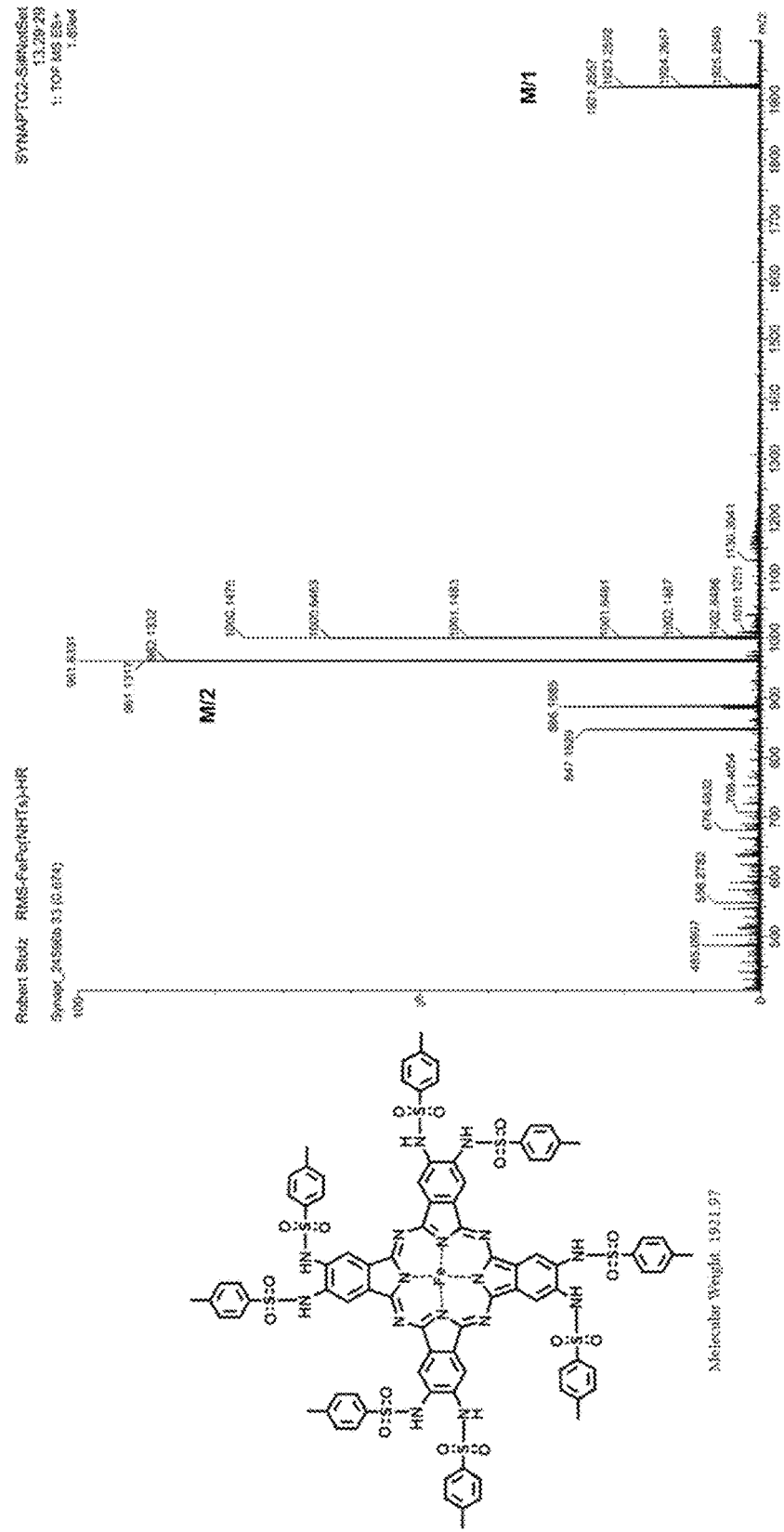
FIG. 8 illustrates high resolution mass spectroscopy analysis of 2,3,9,10,16,17,23,24-octatosylaminophthalocyanine Fe(II) (FePc-NHTs). Electro-spray ionization was used in conjunction with time-of-flight mass spectrometry (TOF MS). The monomer ionized as m/z where z=1 or 2, and the mass of the parent peak was 1921.25 g/mol.

FIG. 8 illustrates high resolution mass spectroscopy analysis of FePc-NHTs. Electro-spray ionization was used in conjunction with TOF MS. The monomer ionized as m/z where z=1 or 2, and the mass of the parent peak was 1921.25 g/mol.

Synthesis of FeOAPc. To a 50 mL round bottom flask charged with 47.4 mg of 2,3,9,10,16,17,23,24-octatosylaminophthalocyanine Cu(II), 142.2 μL of deionized water and 1.42 mL of concentrated $H_2SO_4$ were successively added. The mixture was then heated to 110° C. for 50 minutes under $N_2$. The reaction was then cooled to room temperature, and the reaction mixture was poured into ice-water (25 mL). The dark green precipitate was collected by centrifugation and the solid was washed thoroughly with deionized water (20 mL×3), 10% KOH (20 mL×3), deionized water (20 mL×3), and acetone (20 mL×3). The product was obtained as a dark purple to black powder (yield: 4.4 mg, 25.7%). $^1$H-NMR (500 MHz, DMSO-$D_6$) no proton peaks were observed in low-field NMR experiments.

Synthesis of CoOAPc. The synthetic scheme toward CoOAPc ligand is shown below in Scheme 2.

Scheme 2

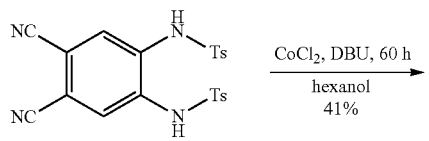

$CoCl_2$, DBU, 60 h
hexanol
41%

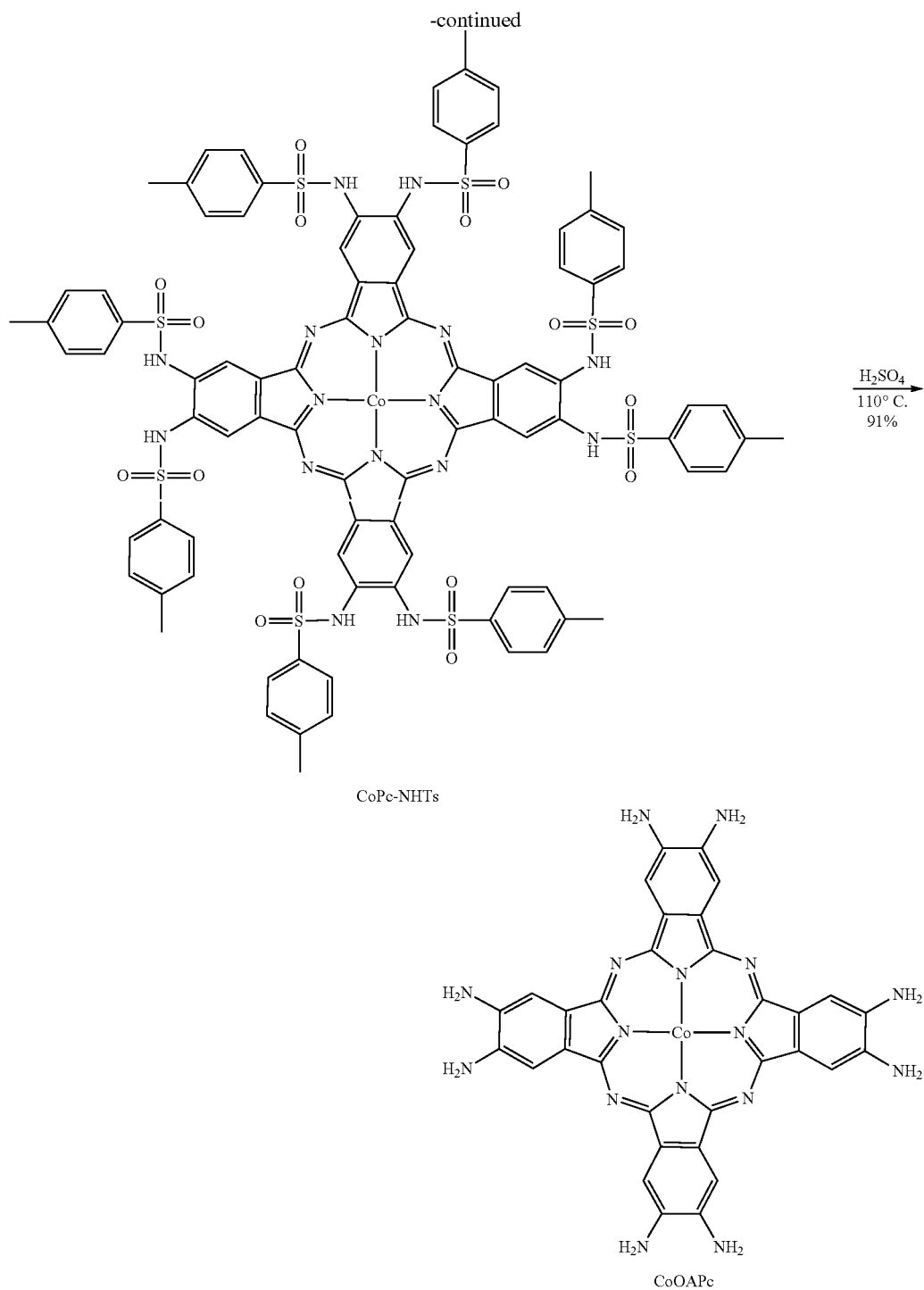

CoPc-NHTs

CoOAPc

Synthesis of 2,3,9,10,16,17,23,24-octatosylaminophthalocyanine Co(II) (CoPc-NHTs). To a suspension of 4.67 g (10 mmol) of N,N'-(4,5-dicyano-1,2-phenylene)bis(4-methylbenzenesulfonamide) and 1.29 g of anhydrous $CoCl_2$ (10 mol, 1.0 eq) in n-hexanol (15 mL) in a glass pressure vessel, 5 mL of DBU (1,8-Diazabicyclo[5.4.0]undec-7-ene) was added. The system was purged with $N_2$ for 10 minutes and then sealed. The reaction vessel was then heated at 175° C. under $N_2$ for 60 hours. Upon cooling to room temperature, the reaction mixture was dissolved in 500 mL mixed solvent of acetic acid and $CH_2Cl_2$ (v/v=1:5). The organic extract was washed with water (300 mL×3) and then evaporated to dryness to generate a blue solid. The residual high boiling point hexanol remaining in the solid was removed by repeatedly dispersing the solid in 40 mL of $CH_2Cl_2$/petroleum ether mixture (v/v=1:3) and decanting the brownish solvent. The blue crude product was passed through a silica gel pad (eluent: $CH_2Cl_2 \rightarrow CH_2Cl_2/MeOH$=100/1) to give as a blue solid, which was further recrystallized in a 100 mL MeOH/$CH_2Cl_2$ mixture (v/v=2:1) to produce dark blue crystals (1.97 g, yield 41%). $^1$H NMR (600 MHz, 298K, deuterated chloroform (CDCl$_3$)) δ=10.56 (s, 4H), 9.91 (s, 4H), 9.81 (s, 4H), 9.36 (s, 4H), 9.07 (d, J=7.9 Hz, 8H), 8.41 (d, J=7.9 Hz, 8H), 7.40 (d, J=7.7 Hz, 7H), 6.61 (d, J=7.7 Hz, 8H), 3.31 (s, 12H), 1.98 (s, 12H). $^{13}$C NMR (150 MHz, 298 K, CDCl$_3$) δ=146.65, 144.01, 138.11, 136.39, 135.37, 133.20, 131.72, 129.63, 128.19, 127.35, 123.79, 122.46, 22.87, 21.51. HRMS (ESI): m/z calcd for C$_{88}$H$_{73}$CoN$_{16}$O$_{16}$S$_8$: 1924.2488; found: 1924.2495 [M+H]$^+$.

Figure 9:
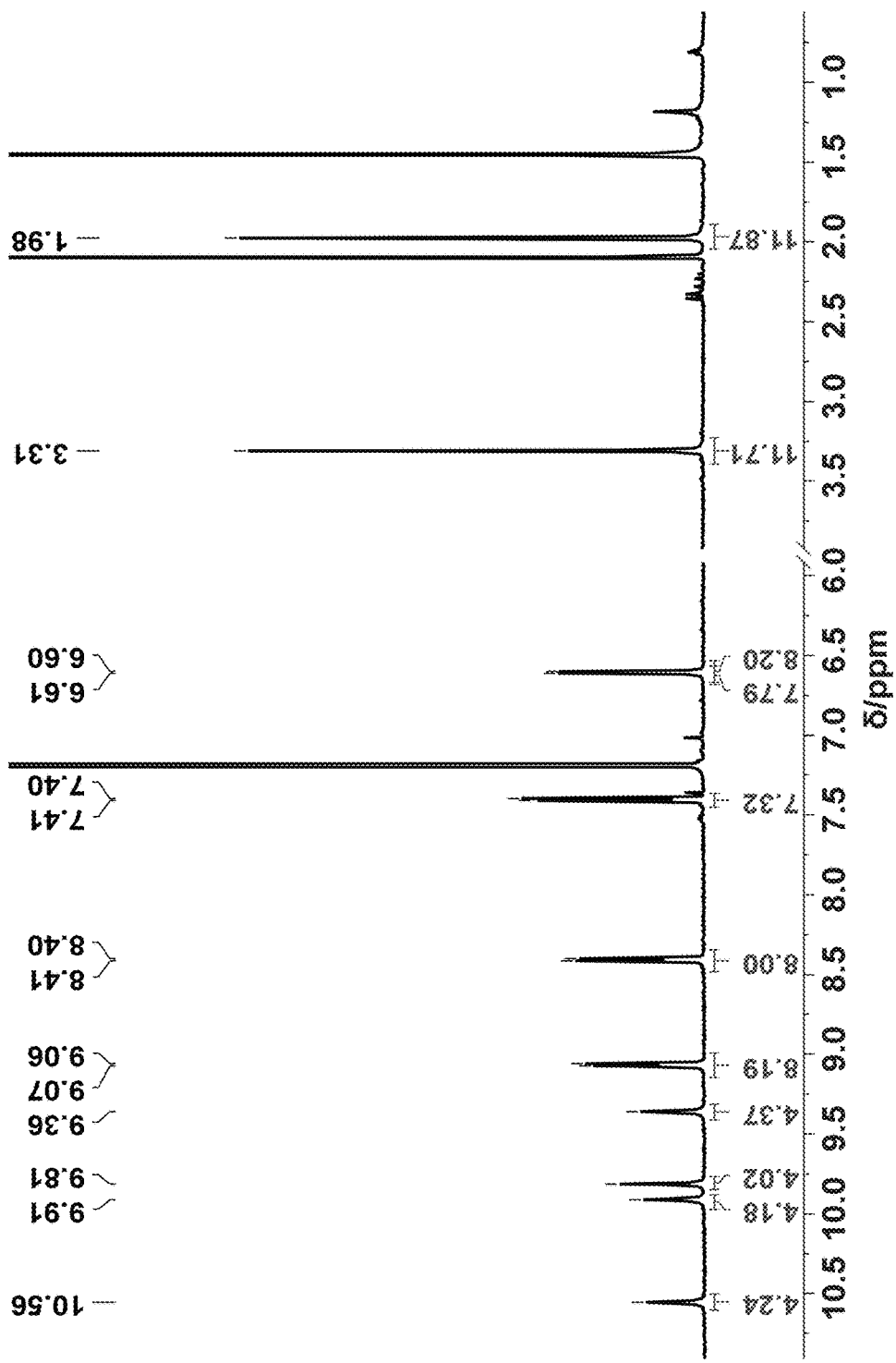
FIG. 9 illustrates $^1$H nuclear magnetic resonance (NMR) (600 M, 298 K, deuterated chloroform ($CDCl_3$)) spectrum of 2,3,9,10,16,17,23,24-octatosylaminophthalocyanine Co(II) (CoPc-NHTs).
Figure 10:
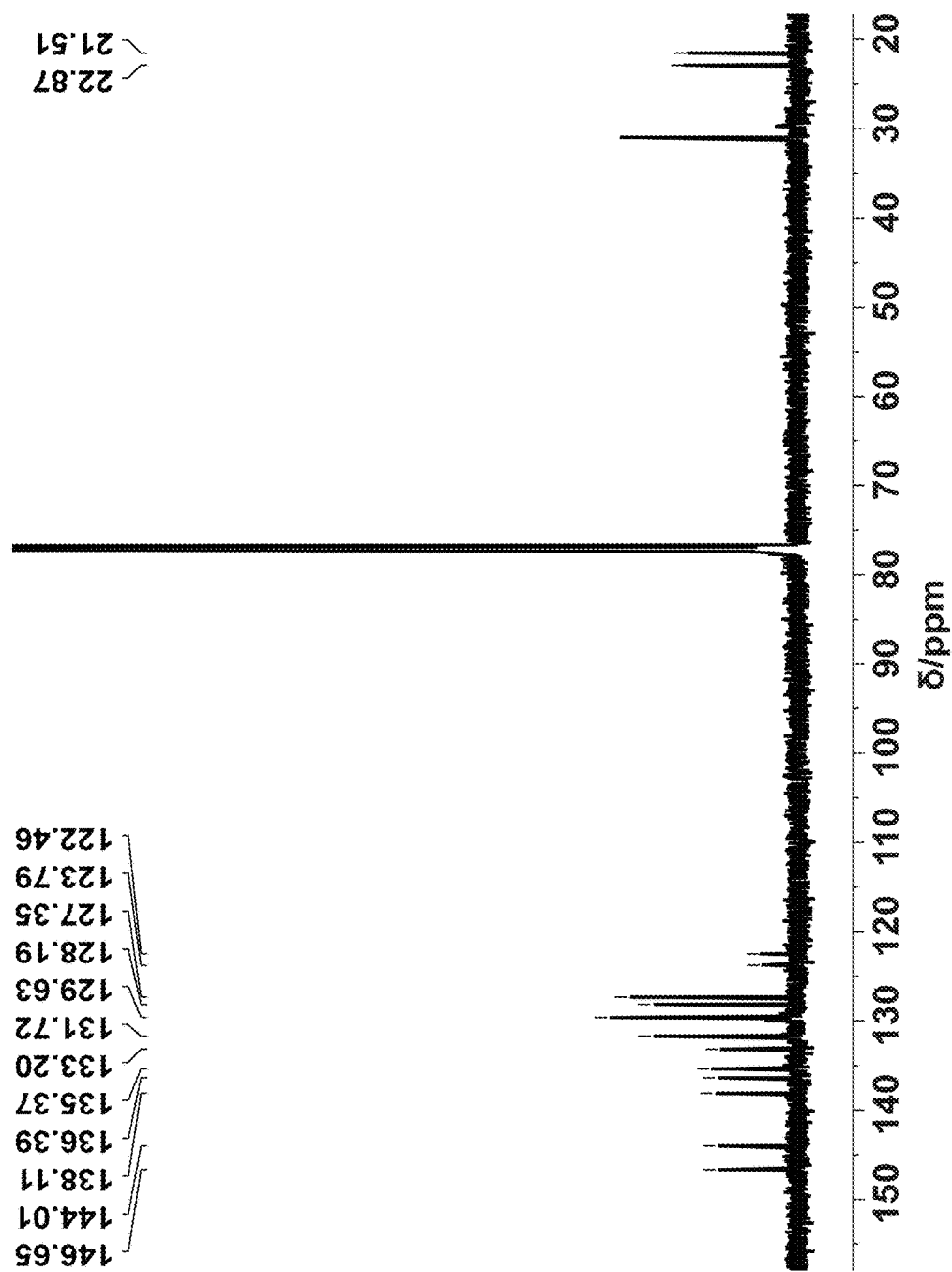
FIG. 10 illustrates $^{13}$C NMR (150 M, 298 K, $CDCl_3$) spectrum of CoPc-NHTs.

FIG. 9 illustrates $^1$H NMR (600 M, 298 K, CDCl$_3$) spectrum of CoPc-NHTs and FIG. 10 illustrates $^{13}$C NMR (150 M, 298 K, CDCl$_3$) spectrum of CoPc-NHTs.

Synthesis of CoOAPc. To a 50 mL round bottom flask charged with 1.0 g (0.51 mmol) of 2,3,9,10,16,17,23,24-octatosylaminophthalocyanine Co(II), a mixture of 3 mL of deionized water and 30 mL of concentrated H$_2$SO$_4$ was added. The mixture was then heated at 110° C. for about 1.5 hour. The reaction was then cooled to room temperature, and the reaction mixture was poured into ice-water (50 mL). The dark blue precipitate was collected by centrifugation and the solid was washed thoroughly with deionized water (20 mL×2), 10% NaOH (20 mL×3), deionized water (20 mL×3), and acetone (20 mL×3) sequentially with the help of a vortex. The product CoOAPc was obtained as a purple to black powder (325 mg, 91%). 1H NMR (600 MHz, DMSO-d$_6$): δ=11.61 (br, 8H), 6.05 (s, 16H). HRMS (ESI): m/z calcd for C$_{32}$H$_{25}$CoN$_{16}$: 692.1779; found: 692.1772 [M+H]$^+$.

Figure 11:
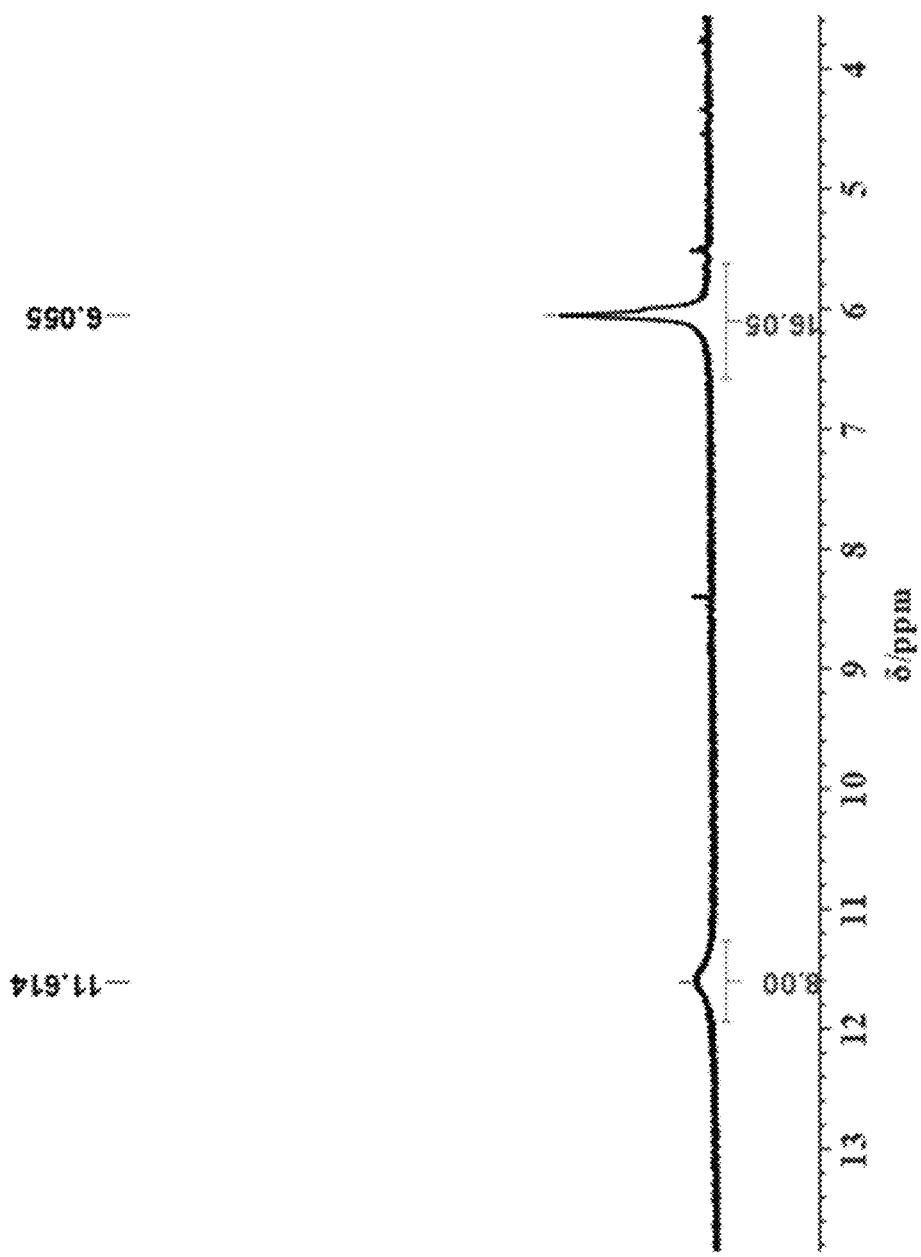
FIG. 11 illustrates $^1$H NMR (600 M, 298 K, dimethyl sulfoxide (DMSO)-$d_6$) spectrum of CoOAPc.

FIG. 11 illustrates $^1$H NMR (600 M, 298 K, DMSO-d$_6$) spectrum of CoOAPc.

Synthesis of CuOAPc. The synthetic scheme toward CuOAPc ligand is shown below in Scheme 3.

Scheme 3

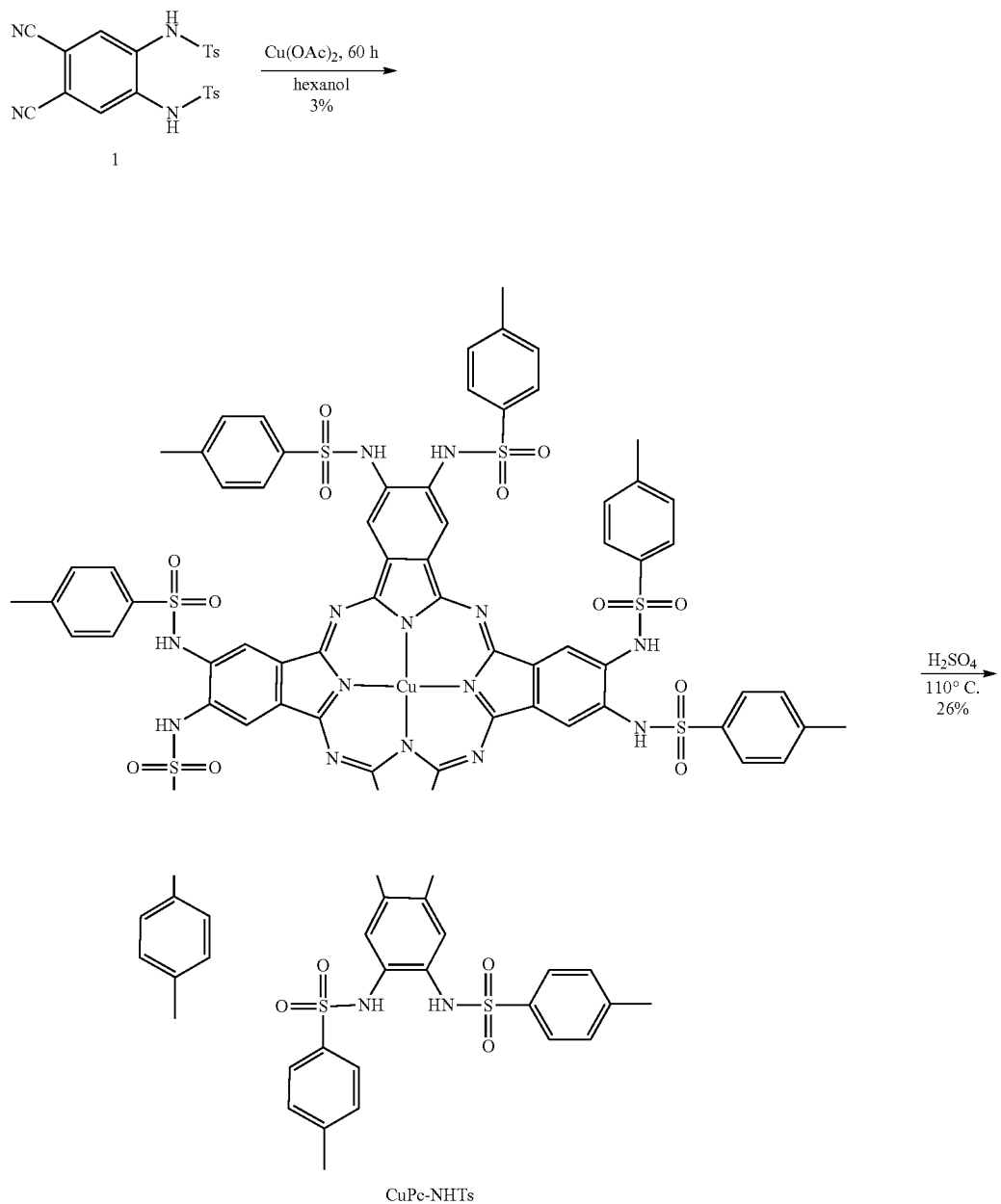

CuPc-NHTs

-continued

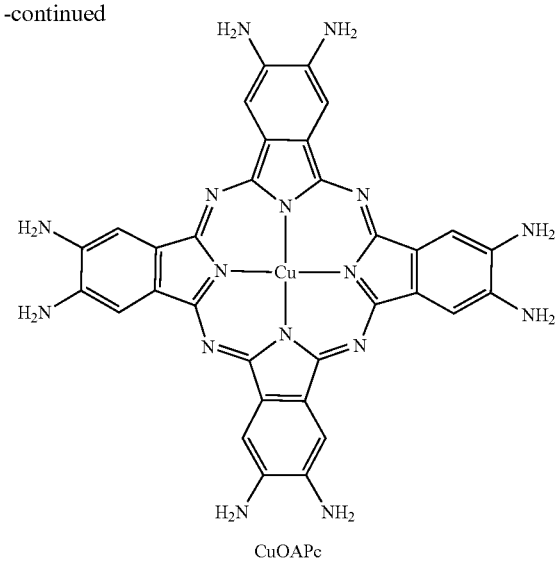

CuOAPc

Synthesis of 2,3,9,10,16,17,23,24-octatosylaminophthalocyanine Cu(II) (CuPc-NHTs). The synthesis of the 2,3,9,10,16,17,23,24-octatosylaminophthalocyanine Cu(II) was adapted from the literature. To a suspension of 1.050 g (2 mmol) of N,N'-(4,5-dicyano-1,2-phenylene)bis(4-methylbenzenesulfonamide) and 0.122 g of Cu(OAc)2 (0.674 mmol, 0.3 eq) in a glass pressure vessel, 5 mL of n-hexanol was added. The system was purged with $N_2$ for 10 minutes and then sealed. The reaction vessel was heated at 180° C. for 36 hours. The reaction was then allowed to cool to room temperature. Once at room temperature, the reaction mixture was dissolved in 66 mL of a mixed solvent system of acetic acid and $CH_2Cl_2$ (v/v=1:10). The organic extract was washed with water (50 mL×3) and then evaporated to dryness to provide an emerald-colored oil. The residual hexanol remaining in the oil was removed by repeatedly dispersing in 154 mL of a mixture $CH_2Cl_2$/petroleum ethers (v/v=1:10) and decanting the brownish solvent. The solids were further purified by column chromatography (silica gel, eluent: $CH_2Cl_2$/MeOH=19/1). The solids were further purified by recrystallization in a $CH_2Cl_2$/MeOH mixture (v/v=3:1) to give a blue solid (35.3 mg, yield 3.26%). 1H-NMR (500 MHz, $CDCl_3$) no proton peaks were observed in low-field NMR experiments. HRMS (ES+) calculated for $C_{88}H_{72}CuN_{16}O_{16}S_8$ 1928.24 [M$^+$]; found 1930.24 m/z.

Figure 12:
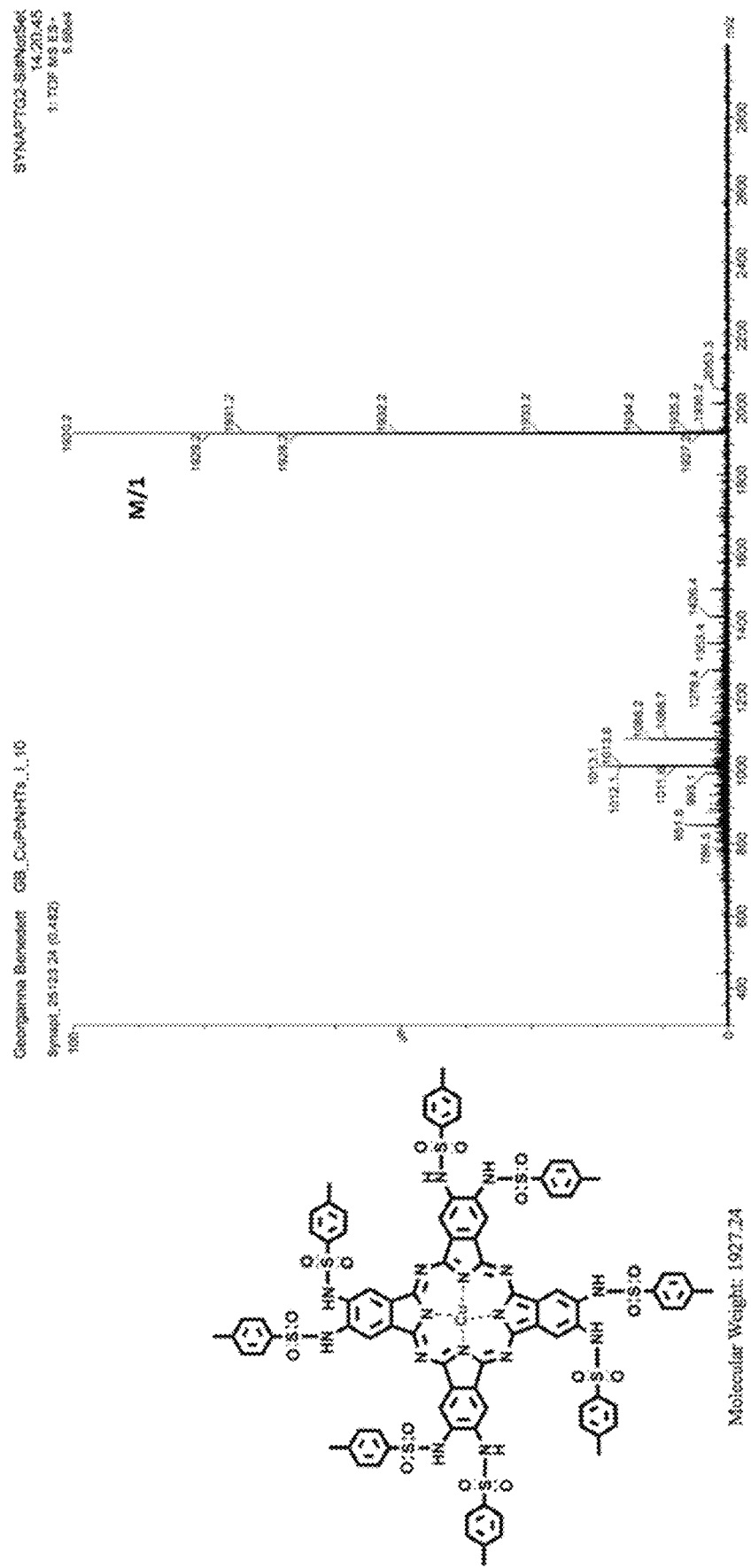
FIG. 12 illustrates high resolution mass spectroscopy analysis of 2,3,9,10,16,17,23,24-octatosylaminophthalocyanine Cu(II) (CuPc-NHTs) Electro-spray ionization was used in conjunction with TOF MS. The monomer ionized as M/1, and the mass of the parent peak was 1930.24 g/mol.

FIG. 12 illustrates high resolution mass spectroscopy analysis of CuPc-NHTs. Electro-spray ionization was used in conjunction with TOF MS. The monomer ionized as M/1, and the mass of the parent peak was 1930.24 g/mol.

Synthesis of CuOAPc. To a 50 mL round bottom flask charged with 47.4 mg of 2,3,9,10,16,17,23,24-octatosylaminophthalocyanine Cu(II), 142.2 µL of deionized water and 1.42 mL of concentrated $H_2SO_4$ were successively added. The mixture was then heated to 110° C. for 50 minutes under $N_2$. The reaction was then cooled to room temperature, and the reaction mixture was poured into ice-water (25 mL). The dark green precipitate was collected by centrifugation and the solid was washed thoroughly with deionized water (20 mL×3), 10% KOH (20 mL×3), deionized water (20 mL×3), and acetone (20 mL×3). The product was obtained as a dark purple to black powder (yield: 4.4 mg, 25.7%). $^1$H-NMR (500 MHz, $CDCl_3$) no proton peaks were observed in low-field NMR experiments.

Synthesis of MPc-Pyr-COFs. The synthetic scheme toward FePc-Pyr-COF is shown below in Scheme 4.

Scheme 4

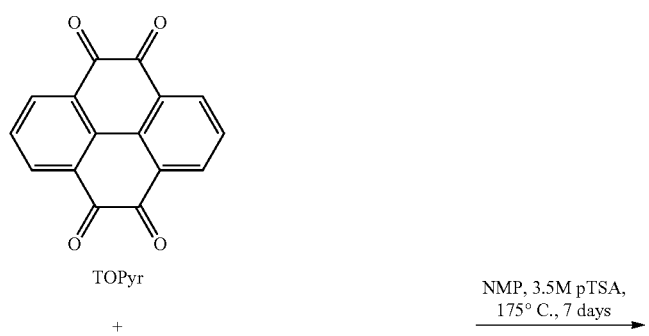

TOPyr

+

NMP, 3.5M pTSA,
175° C., 7 days

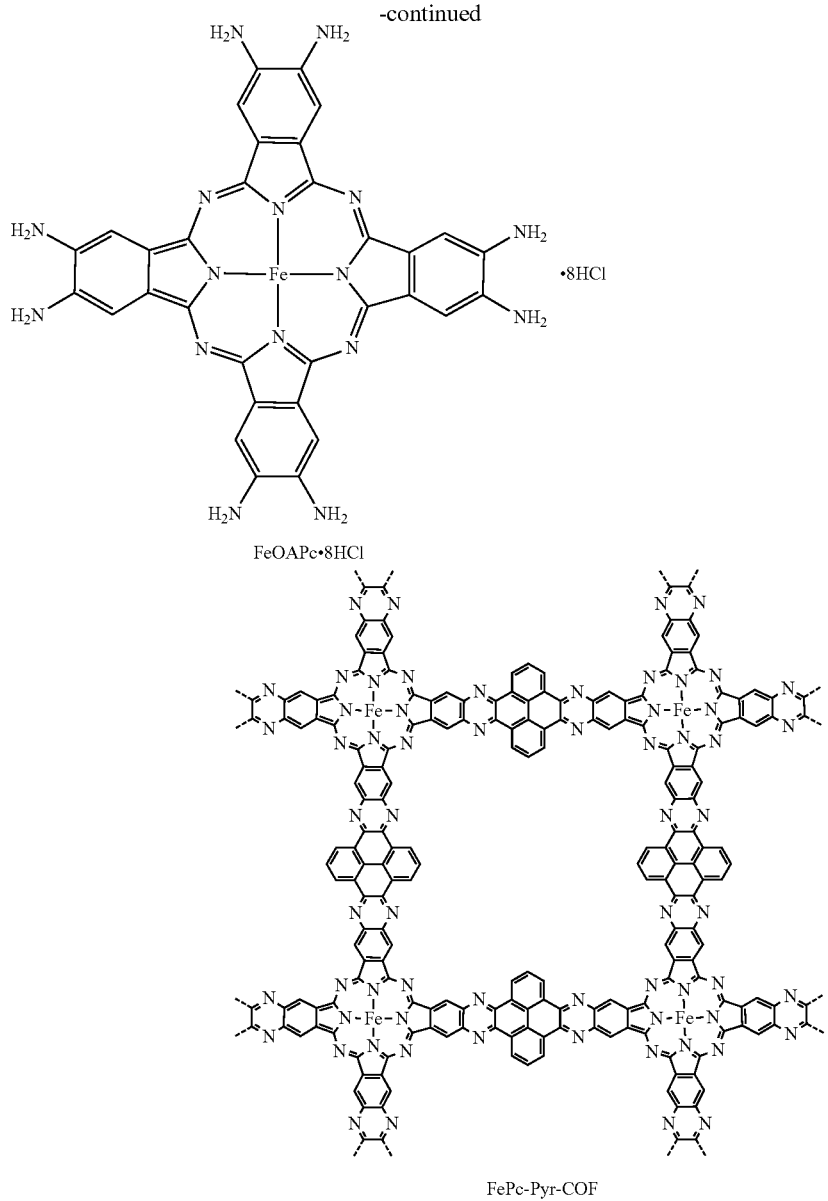

FeOAPc•8HCl

FePc-Pyr-COF

General synthesis of FePc-Pyr-COF. To prepare COFs, 7 mg (0.0077 mmol, 1 eq.) of FePcOAc and desired solvent (see Solvent System, Table 1) were added to a 15 mL glass pressure vessel. The vessel was purged for 10 min with nitrogen. After degassing, 200 μL of pTSA (3.5 M) was added to the reaction. Pyrenetetraone 4 mg (0.0154 mmol, 2 eq.) was then added under $N_2$. The reaction was allowed to degas with $N_2$ for an additional 5 min before being sealed and heated to 170° C. for 3 days. The reaction was allowed to cool to room temperature before being poured into acetone and centrifuged. The solids were washed with acetone (20 mL×3), 10% KOH (20 mL×3), deionized water (20 mL×3), and acetone (20 mL×3). The solids were dried overnight under a stream of nitrogen.

TABLE 1

Conditions used to synthesize CoPc-Pyr-COF.

| Entry | Solvent System | [NiOAPc]/mM | Catalyst | Temperature/° C. | Time |
|---|---|---|---|---|---|
| 1 | DCB/DMAC (1/1) | 2 | $H_2SO_4$ (9 eq) | 180 | 7 d |
| 2 | NMP/mestylene(2/1) | 3 | pTSA (s, 290 eq) | 180 | 7 d |
| 3 | NMP/mestylene(2/1) | 3 | $H_2SO_4$ (9 eq) | 180 | 3 d |
| 4 | NMP/mestylene(2/1) | 12 | 3.5M pTSA (aq, 35 q) | 180 | 3 d |
| 5 | NMP/mestylene(2/1) | 12 | 3.5M pTSA (aq, 35 eq) | 175 | 7 d |
| 6 | NMP/mestylene(2/1) | 12 | 3.5M pTSA (aq, 35 eq) | 175 | 7 d |

TABLE 1-continued
Conditions used to synthesize CoPc-Pyr-COF.
| Entry | Solvent System | [NiOAPc]/mM | Catalyst | Temperature/° C. | Time |
|---|---|---|---|---|---|
| 7 | NMP/mestylene(2/1) | 12 | H$_2$SO$_4$ (9 eq) | 175 | 3 d |
| 8 | NMP/mestylene(2/1) | 12 | 6M HOAc (aq, 120) | 120 | 6 d |
| 9 | NMP/mestylene(2/1) | 12 | 6M HOAc (aq, 120) | 120 | 12 d |
| 10 | NMP | 3.5 | 3.5M pTSA (aq, 35 eq) | 175 | 7 d |
Synthesis of CoPc-Pyr-COF. The synthetic scheme toward CoPc-Pyr-COF is shown below in Scheme 5.
Scheme 5
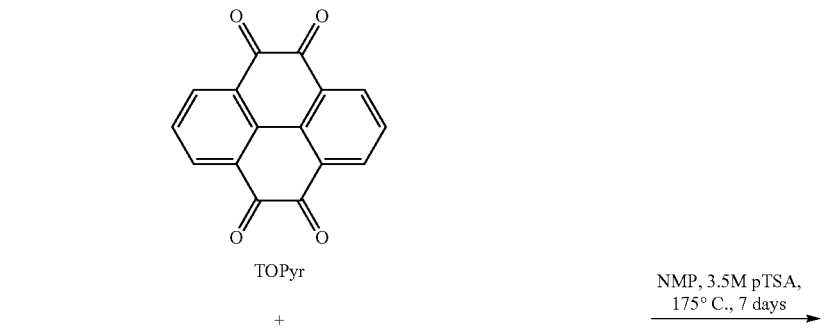
TOPyr
+
NMP, 3.5M pTSA,
175° C., 7 days
→
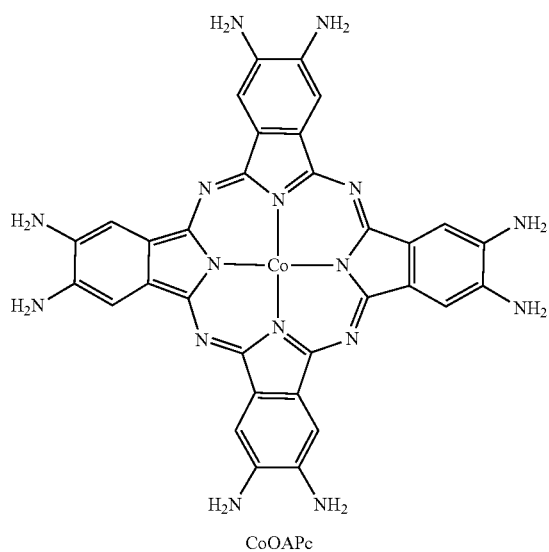
CoOAPc -continued

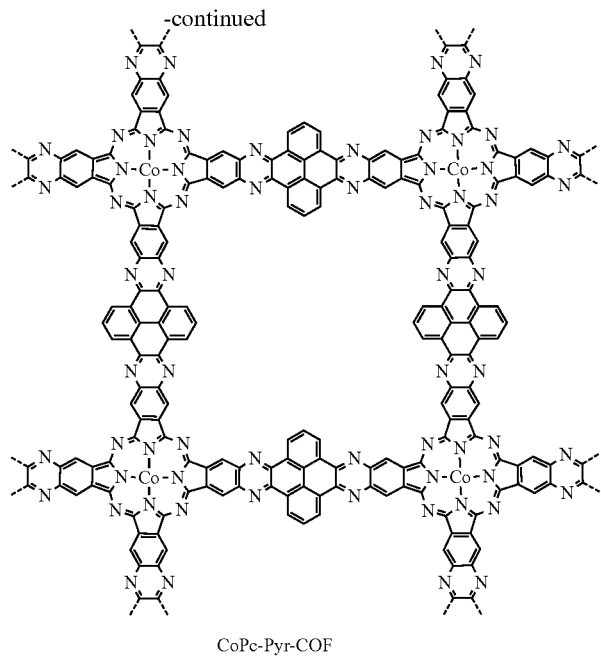

CoPc-Pyr-COF

General synthesis of CoPc-Pyr-COF. 23 mg (0.02 mmol, 1 eq.) of CoPcOAc and desired solvent (see Solvent System, Table 1) to a 15 mL glass pressure vessel. The vessel was purged for 10 min with nitrogen. After degassing, acid catalyst was added to the reaction mixture. Pyrene-tetraone 15 mg (0.04 mmol, 2 eq.) was then added under $N_2$. The reaction was allowed to degas with $N_2$ for an additional 5 min before being sealed and heated to 180° C. for 7 days. The reaction was allowed to cool to room temperature before being poured into acetone and centrifuged. The solids were washed with acetone (20 mL×3), 10% KOH (20 mL×3), deionized water (20 mL×3), and acetone (20 mL×3). The solids were dried overnight under a stream of nitrogen.

Synthesis of CuPc-Pyr-COF. The synthetic scheme toward CuPc-Pyr-COF is shown below in Scheme 6.

Scheme 6

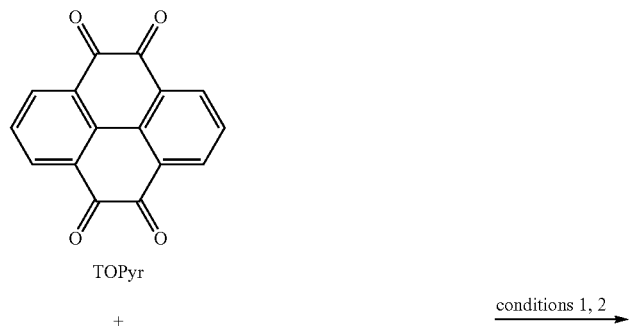

TOPyr

+ conditions 1, 2 →

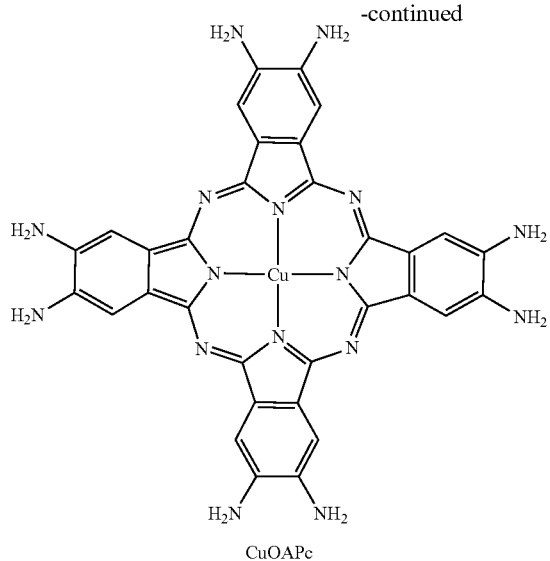

CuOAPc

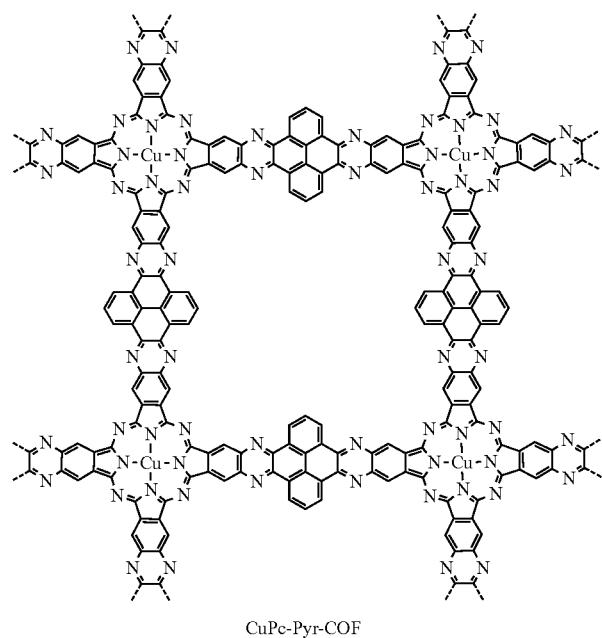

CuPc-Pyr-COF

General synthesis of CuPc-Pyr-COF. To prepare COFs, 7 mg (0.0077 mmol, 1 eq.) of CuPcOAc and desired solvent (see Solvent System, Table 1) to a 15 mL glass pressure vessel. The vessel was purged for 10 min with nitrogen. After degassing, acid catalyst was added to the reaction mixture. Pyrene-tetraone 4 mg (0.0154 mmol, 2 eq.) was then added under $N_2$. The reaction was allowed to degas with $N_2$ for an additional 5 min before being sealed and heated to 170° C. for 3 days. The reaction was allowed to cool to room temperature before being poured into acetone and centrifuged. The solids were washed with acetone (20 mL×3), 10% KOH (20 mL×3), deionized water (20 mL×3), and acetone (20 mL×3). The solids were dried overnight under a stream of nitrogen.

EXAMPLE 2.2

Powder X-Ray Diffraction (pXRD) Characterization of COFs

Figure 13:
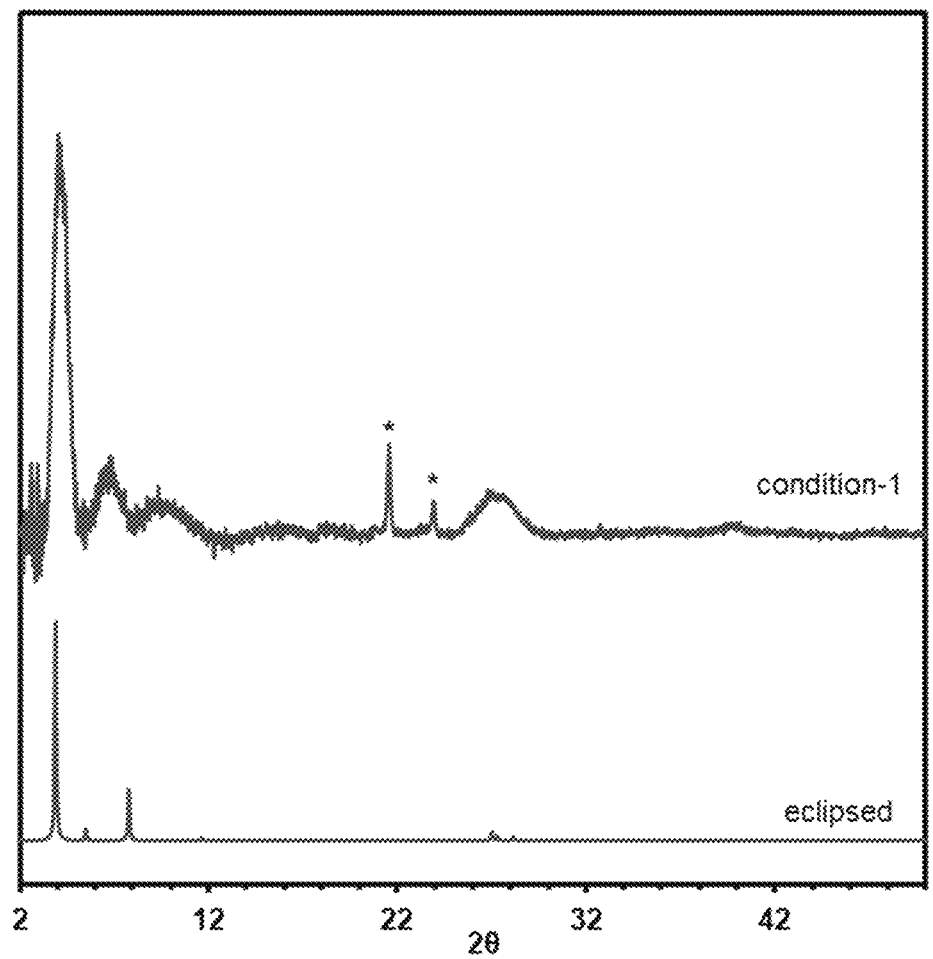
FIG. 13 illustrates powder patterns obtained for various synthetic conditions leading to FePc-Pyr-COF.

Characterization of FePc-Pyr-COF by pXRD. FIG. 13 illustrates powder patterns obtained for various synthetic (Table 2) conditions leading to FePc-Pyr-COF. Powder patterns plotted against the computationally modeled eclipsed stacking structure. Peaks corresponding to petroleum jelly sued to secure the powder to the pXRD plate is labeled with an asterisk (*).

TABLE 2

Conditions used to synthesize FePc-Pyr-COF.

| Condition | Solvent System | Catalyst |
|---|---|---|
| 1 | NMP 100% | 3.5M pTSA (200 µL) |

Figure 14:
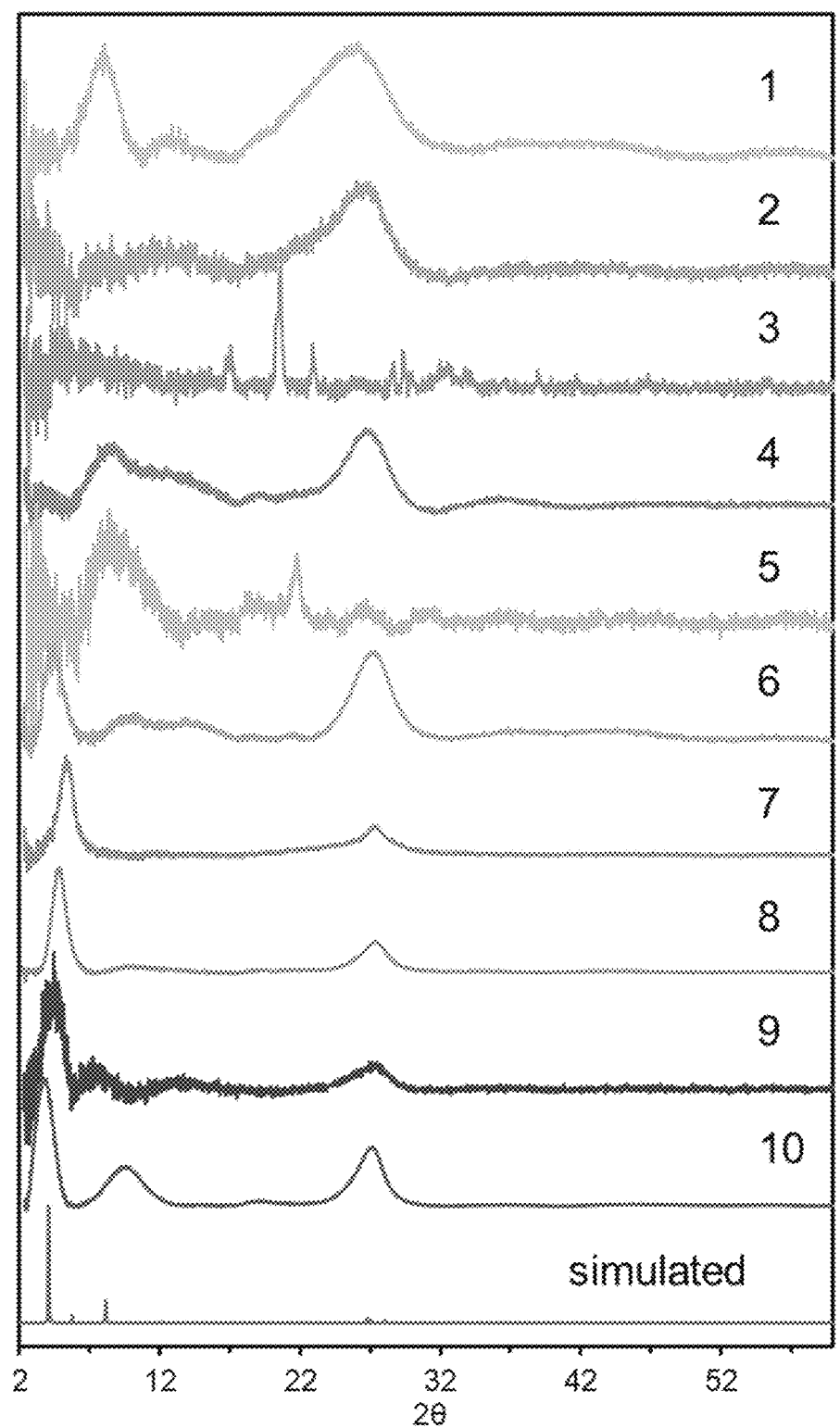
FIG. 14 illustrates experimental pXRD under various conditions and simulated pPXRD for CoPc-Pyr-COF. Powder patterns plotted against the computationally modeled eclipsed stacking structure.

Characterization of CoPc-Pyr-COF by pXRD. FIG. 14 illustrates experimental pXRD under various conditions (Table 1) and simulated pPXRD for CoPc-Pyr-COF. Powder patterns plotted against the computationally modeled eclipsed stacking structure.

Figure 15:
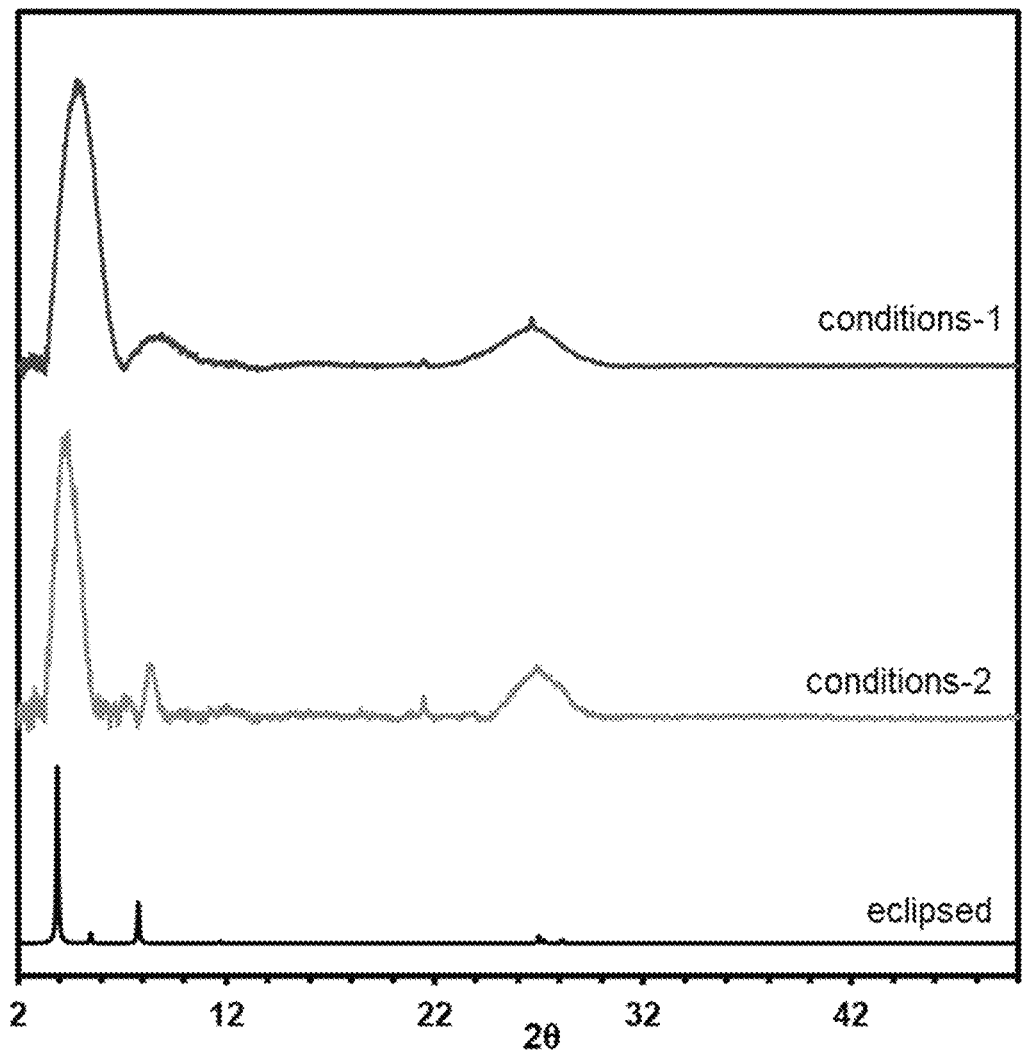
FIG. 15 illustrates powder patterns plotted against the computationally modeled eclipsed stacking structure.

Characterization of CuPc-Pyr-COF by pXRD. Powder patterns obtained for various synthetic conditions (Table 3) leading to CuPc-Pyr-COF. FIG. 15 illustrates powder patterns plotted against the computationally modeled eclipsed stacking structure.

TABLE 3

Conditions used to synthesize CuPc-Pyr-COF.

| Condition | Solvent System | Catalyst |
|---|---|---|
| 1 | DMAC (7.5 mL): DCB (7.5 mL) | $H_2SO_4$ |
| 2 | DMAC (10 mL): DCB (5 mL) | $H_2SO_4$ |
| 3 | NMP (1.673 mL) | PTSA (0.117 mL) |

EXAMPLE 2.3

Scanning Electron Microscopy (SEM) of COF Materials

Figure 16:
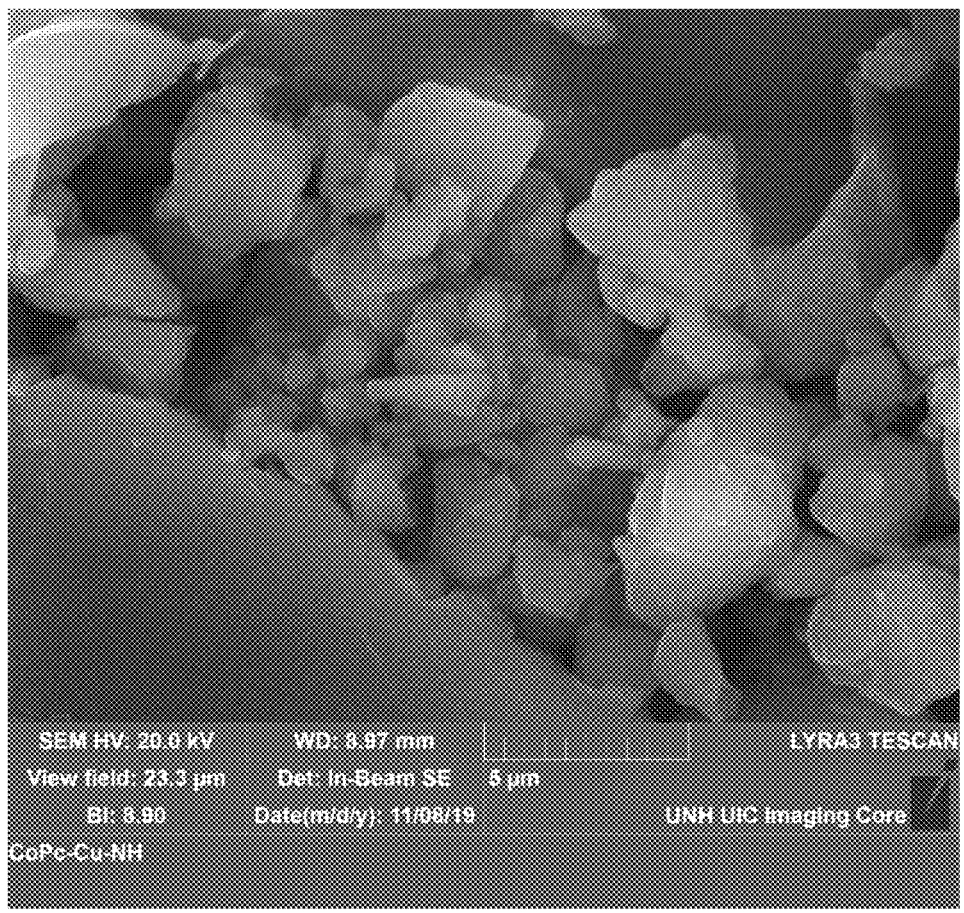
FIG. 16 illustrates SEM of CoPc-Pyr-COF synthesized using condition 10.
Figure 17:
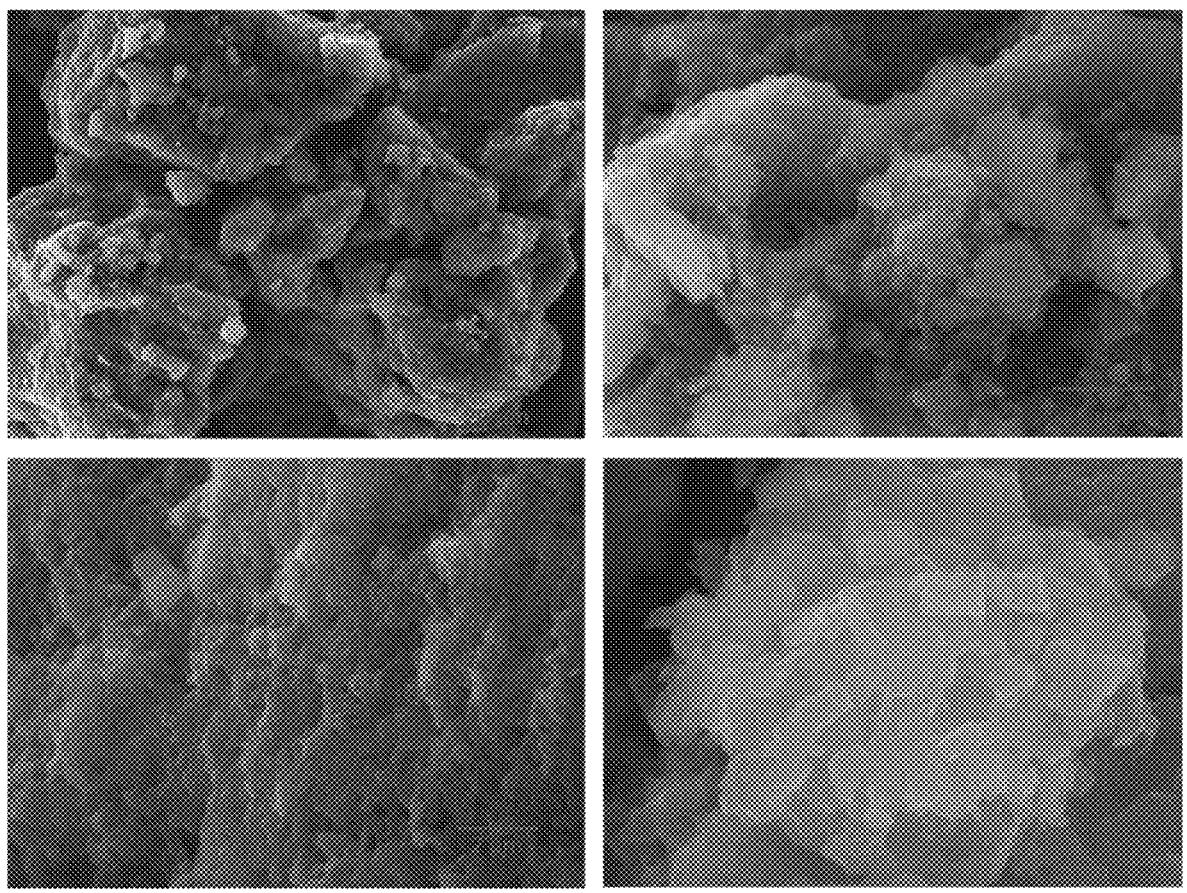
FIG. 17 illustrates SEM of CuPc-Pyr-COF synthesized using condition 1.
Figure 18:
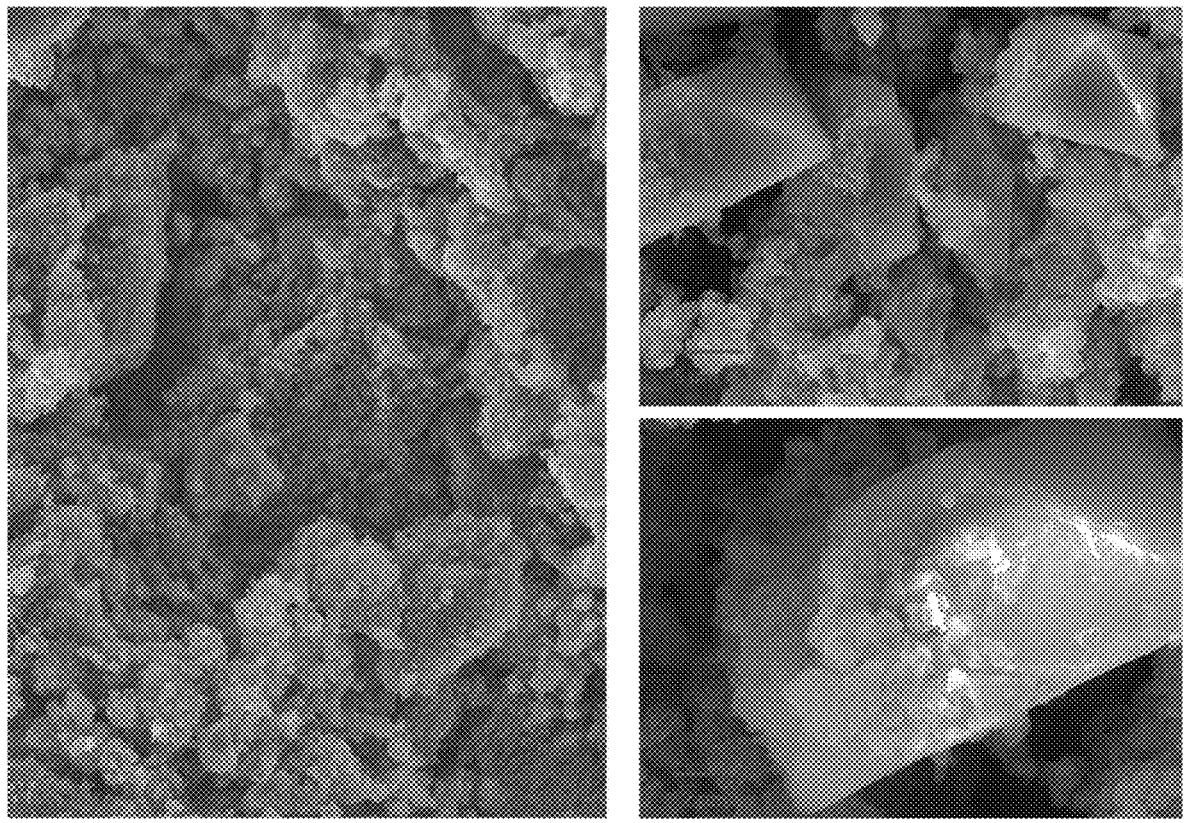
FIG. 18 illustrates scanning electron microscopy of CuPc-pyr-COF synthesized using condition 2.

FIG. 16 illustrates scanning electron microscopy of CoPc-Pyr-COF synthesized using condition 10 in Table 1. FIG. 17 illustrates scanning electron microscopy of CuPc-pyr-COF synthesized using condition 1 (Table 1). Working distance: 2.79 mm, SEM voltage: 20 kV-50 kV. FIG. 18 illustrates scanning electron microscopy of CuPc-pyr-COF synthesized using condition 2. Working distance: 2.79 mm, SEM voltage: 20 kV-50 kV.

EXAMPLE 2.4

Computational Study of Electronic Properties

For computation of electronic properties of the COFs, including band structure, density of states, the functional generalized gradient approximation (GGA) with Perdew-Burke-Ernzerhof (PBE) was employed with an energy cutoff set at 530 eV. The SCF tolerance is set at ultra-fine level at $5.0\times10^{-7}$ eV/atom. The Brillouin zones were sampled using a 2×2×4 k-point mesh in the Monkhorst-Pack scheme.

Figure 19A:
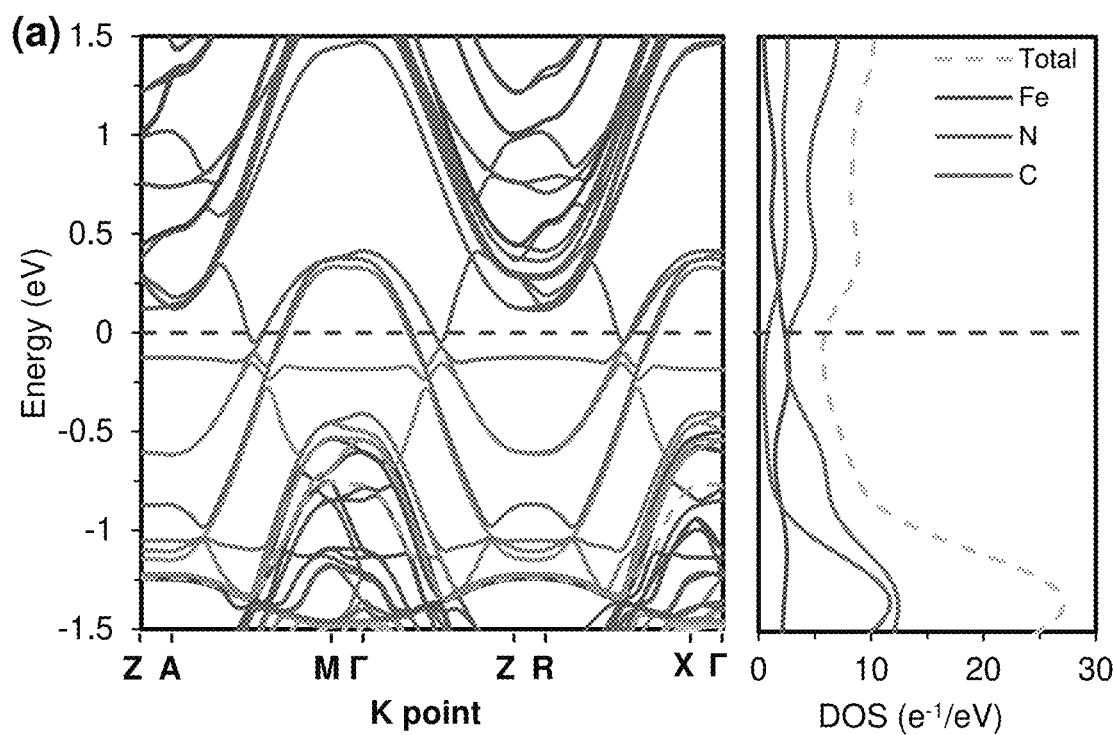
FIGS. 19A and 19B illustrate (FIG. 19A) calculated electronic band structure (left side) and density of state (right side) for FePc-Pyr-COF and (FIG. 19B) the corresponding first Brillouin zone and high-symmetry K-points.
Figure 19B:
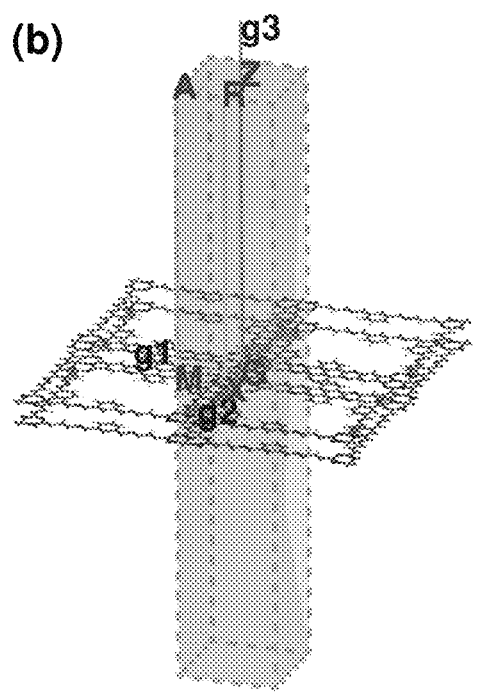
Figure 20A:
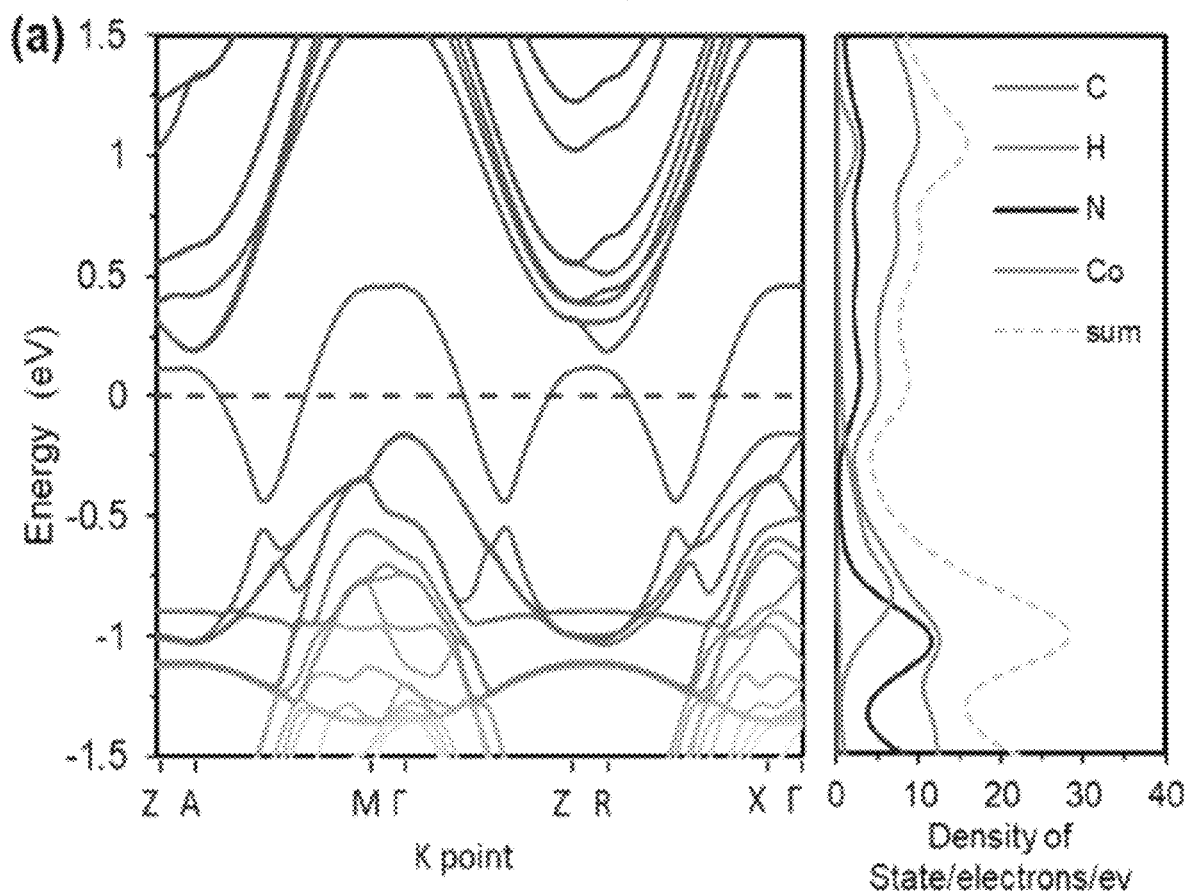
Figure 20B:
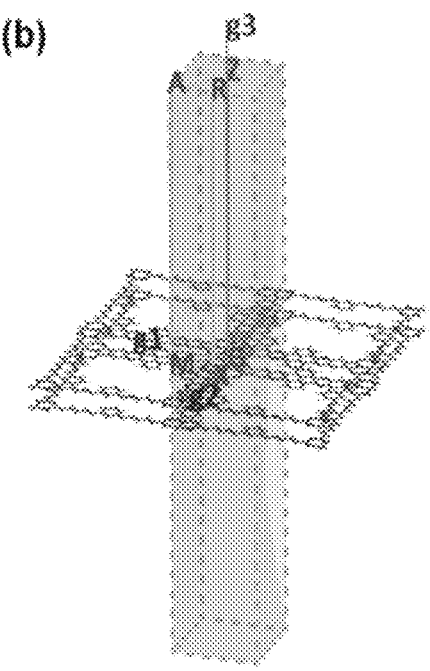
Figure 21A:
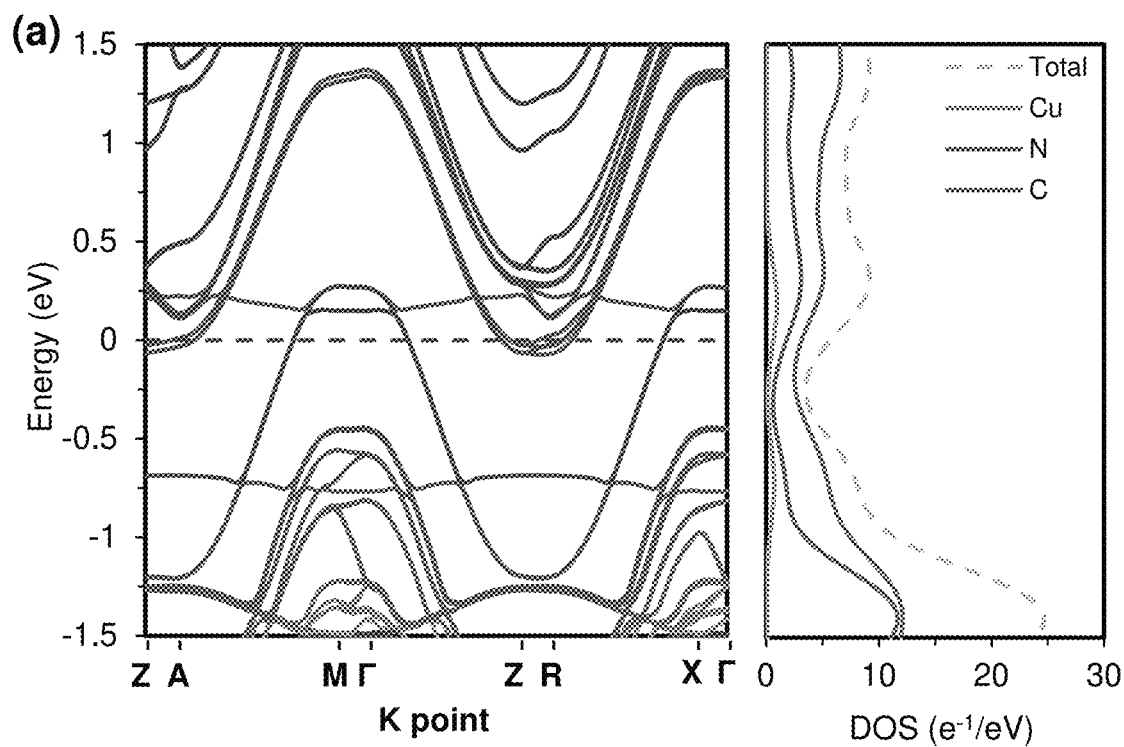
FIGS. 21A and 21B illustrate (FIG. 21A) calculated electronic band structure (left side) and density of state (right side) for CuPc-Pyr-COF and (FIG. 21B) the corresponding first Brillouin zone and high-symmetry K-points.
Figure 21B:
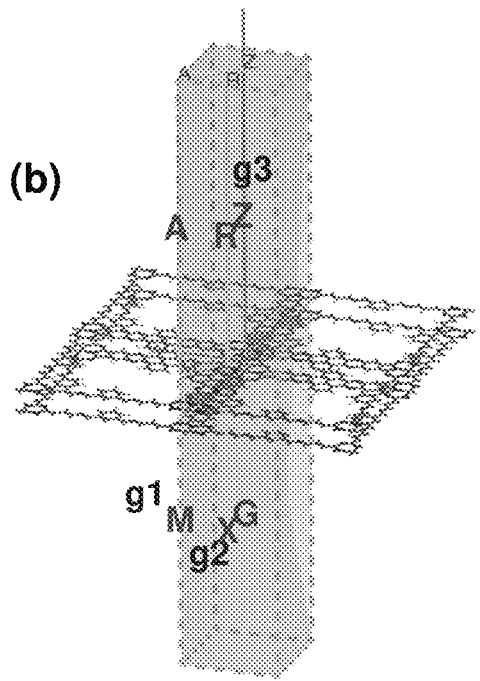

FIG. 19A illustrates calculated electronic band structure (left side) and density of state (right side) for FePc-Pyr-COF and FIG. 19B illustrates the corresponding first Brillouin zone and high-symmetry K-points. FIG. 20A illustrates calculated electronic band structure (left side) and density of state (right side) for CoPc-Pyr-COF and FIG. 20B illustrates the corresponding first Brillouin zone and high-symmetry K-points. FIG. 21A illustrates calculated electronic band structure (left side) and density of state (right side) for CuPc-Pyr-COF and FIG. 21B illustrates the corresponding first Brillouin zone and high-symmetry K-points.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of sensing an analyte in a sample, said method comprising:
    exposing the sample to an electrode comprising a covalent-organic framework, wherein the covalent-organic framework is in the form of a square lattice comprising a plurality of metallophthalocyanine units that are linked to one another by aromatic linkers, wherein the aromatic linkers are conjugated;
    detecting a change in a property of the electrode; and
    correlating the change in the property to the presence or absence of the analyte.

2. The method of claim 1, wherein the metallophthalocyanine units are selected from the group consisting of octatosylaminophthalocyanine, octaamino-nickelphtalocyanine, nickelphtalocyanine, and combinations thereof.

3. The method of claim 1, wherein the metallophthalocyanine units comprise one or more metals selected from the group consisting of first row transition metals, divalent metals, transition metals, iron, nickel, copper, cobalt, zinc, manganese, platinum, palladium, gold, bismuth, chromium, magnesium, tin, and combinations thereof.

4. The method of claim 3, wherein the metallophthalocyanine units comprise nickel.

5. The method of claim 1, wherein the aromatic linkers comprise pyrenes.

6. The method of claim 5, wherein the pyrenes comprise pyrenetetraone.

7. The method of claim 1, wherein the aromatic linkers and the metallophthalocyanine units are linked through pyrazine rings.

8. The method of claim 7, wherein the pyrazine rings comprise phenazine.

9. The method of claim 1, wherein the covalent-organic framework has a fully aromatic and conjugated structure.

10. The method of claim 1, wherein the covalent-organic framework has a planar and two-dimensional structure.

11. The method of claim 1, wherein the analyte comprises a gaseous analyte.

12. The method of claim 11, wherein the gaseous analyte is selected from the group consisting of $NH_3$ (ammonia), $H_2S$ (hydrogen sulfide), NO (nitric oxide), $NO_2$ (nitrogen dioxide), and combinations thereof.

13. The method of claim 1, wherein the detected change in the property of the electrode is a change in normalized conductance, and wherein the change in normalized conductance is characterized by the following formula: $-\Delta G/G_0 = -(I_0-I)/I_0 \times 100\%$, where $-\Delta G/G_0$ represents normalized conductance, $I_0$ represents initial current, and I represents current at various points during measurement.

14. The method of claim 1, wherein the change in the property of the electrode is correlated to the presence or absence of the analyte by comparing the change in the property to the change in property of the electrode in response to known analytes.

15. The method of claim 1, wherein the covalent-organic framework exhibits a conductivity of at least $2.51 \times 10^3$ siemens per meter (S/m).

16. A covalent-organic framework comprising:
a plurality of metallophthalocyanine units, that are linked to one another by aromatic linkers, wherein the aromatic linkers are conjugated, and wherein the covalent-organic framework is in the form of a square lattice.

17. The covalent-organic framework of claim 16, wherein the metallophthalocyanine units are selected from the group consisting of octatosylaminophthalocyanine, octaaminonickelphtalocyanine, nickelphtalocyanine, and combinations thereof.

18. The covalent-organic framework of claim 16, wherein the metallophthalocyanine units comprise one or more metals selected from the group consisting of first row transition metals, divalent metals, transition metals, iron, nickel, copper, cobalt, zinc, manganese, platinum, palladium, gold, bismuth, chromium, magnesium, tin, and combinations thereof.

19. The covalent-organic framework of claim 18, wherein the metallophthalocyanine units comprise nickel.

20. The covalent-organic framework of claim 16, wherein the aromatic linkers comprise pyrenes.

21. The covalent-organic framework of claim 20, wherein the pyrenes comprise pyrenetetraone.

22. The covalent-organic framework of claim 16, wherein the aromatic linkers and the metallophthalocyanine units are linked through pyrazine rings.

23. The covalent-organic framework of claim 22, wherein the pyrazine rings comprise phenazine.

24. The covalent-organic framework of claim 16, wherein the covalent-organic framework has a fully aromatic and conjugated structure.

25. The covalent-organic framework of claim 16, wherein the covalent-organic framework has a planar and two-dimensional structure.

26. The method of claim 1, wherein the square lattice comprises a plurality of square apertures.

27. The covalent-organic framework of claim 16, wherein the square lattice comprises a plurality of square apertures.

* * * * *